(12) United States Patent
Dang et al.

(10) Patent No.: US 8,056,027 B2
(45) Date of Patent: *Nov. 8, 2011

(54) CHARACTERIZING THERMOMECHANICAL PROPERTIES OF AN ORGANIC SUBSTRATE USING THREE-DIMENSIONAL FINITE ELEMENT ANALYSIS

(75) Inventors: Hien Phu Dang, Nanuet, NY (US); Vijaveshwar Das Khanna, Millwood, NY (US); Arun Sharma, New Rochelle, NY (US); Sri M. Sri-Jayantha, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 433 days.

This patent is subject to a terminal disclaimer.

(21) Appl. No.: 12/260,718

(22) Filed: Oct. 29, 2008

(65) Prior Publication Data

US 2009/0312960 A1 Dec. 17, 2009

Related U.S. Application Data

(63) Continuation-in-part of application No. 12/136,886, filed on Jun. 11, 2008, now abandoned, and a continuation-in-part of application No. 12/136,876, filed on Jun. 11, 2008, now abandoned.

(51) Int. Cl.
*G06F 17/50* (2006.01)
*G06K 9/00* (2006.01)
(52) U.S. Cl. ............. 716/55; 716/30; 716/51; 716/53; 382/144; 382/145

(58) Field of Classification Search ............ 716/30, 716/51, 52, 55, 53; 382/144–145
See application file for complete search history.

(56) References Cited

U.S. PATENT DOCUMENTS

2009/0310848 A1* 12/2009 Dang et al. ............... 382/145

OTHER PUBLICATIONS

Zhang, Z. et al., FEM modleing of temperature distribution of a flip-chip no-flow underfill package during solder reflow process, Jan. 2004, IEEE, pp. 86-93.*
Yao, Q. et al., "Three-dimensional vs. two-dimensional finite element modeling of flip chip packages", Dec. 1998., Georgia Institute of Technology. pp. 1-38.*

* cited by examiner

*Primary Examiner* — Stacy Whitmore
(74) *Attorney, Agent, or Firm* — Ryan, Mason & Lewis, LLP

(57) ABSTRACT

A method for characterizing thermomechanical properties of an organic substrate includes the steps of: receiving an image of the substrate, the image including a geometric description of the circuit layers of the substrate; selecting a given one of the circuit layers for processing; converting the image to a 2-D FEM image of the given circuit layer; repeating the steps of selecting a given one of the circuit layers and converting the image to a 2-D FEM image of the selected layer until all of the layers have been processed; combining all of the 2-D FEM images corresponding to the layers to form a 3-D FEM image representing at least a portion of the substrate; determining a coefficient of thermal expansion (CTE), modulus and/or Poisson's ratio of the 3-D FEM image; and constructing a 3-D representation of the substrate as a function of the CTE, modulus and/or Poisson's ratio of the 3-D FEM image.

18 Claims, 15 Drawing Sheets

300

400

500

600

EMBEDDED RESIN INTO 3-D GEOMETRY OF THE COPPER CIRCUIT LAYER

1300

CHARACTERIZING THERMOMECHANICAL PROPERTIES OF AN ORGANIC SUBSTRATE USING THREE-DIMENSIONAL FINITE ELEMENT ANALYSIS

CROSS-REFERENCE TO RELATED APPLICATION(S)

This application is a continuation-in-part of U.S. application Ser. No. 12/136,886 filed on Jun. 11, 2008 now abandoned and U.S. application Ser. No. 12/136,876 filed on Jun. 11, 2008 now abandoned, the disclosures of which are incorporated herein by reference in their entireties.

FIELD OF THE INVENTION

The present invention relates generally to electrical and electronic devices, and more particularly relates to organic substrate modeling.

BACKGROUND OF THE INVENTION

Projection of organic substrate warp is critical to cost effective development and production of an electronic module (microelectronic package). Current warp prediction (estimation) methodologies rely on significant approximations of the circuit structure of an organic chip carrier (substrate). These current prediction methods lead to a warp prediction that is often inaccurate, and thus not very useful. Ultimately, these inaccuracies result in organic chip carriers that are higher in cost and/or less reliable than desired. This can occur, for example, when an integrated circuit (IC) chip cannot be joined to the chip site due to poor chip site co-planarity. In other words, a flat chip cannot be joined to a non-flat substrate because interconnections may be misaligned causing electrical open-circuits.

Another manifestation of poor warp prediction is where, due at least in part to warp of the chip carrier, some inputs/outputs (I/O) of the chip cannot be connected to the organic chip carrier I/O where other chip I/O is able to be in a correct proximity to be joined. This may cause a high rework rate in manufacturing, thereby causing costs to increase. If this defect is not detected during in-line electrical testing, the reliability of the organic chip carrier may be compromised.

A silicon die with high density I/O requires an organic substrate to facilitate integration on a system board. A substrate usually consists of a core at the center and multiple layers of metal interconnects on both sides of the core. A substrate facilitates the formation of electrical links to the system board. The substrate also protects the die and modularizes the product development effort while simplifying the subsequent integration steps involved in the manufacturing of a larger computer or a consumer electronic product. The present trend in substrate technology is to transition from ceramic-based substrates to organic material-based systems. An organic polymer-based electronic substrate is a cost-effective means to fan out the I/O and power connections from a high density silicon die.

Organic substrates typically have a core about 400-800 microns (μm) thick, made of glass-fiber reinforced organic or resin material. In order to reduce cost, the core is eliminated in some substrates (e.g., coreless substrate). Metal interconnects are progressively built, layer-by-layer, on a top and bottom of the core by a series of process steps. These steps typically involve electroless-plating, electroplating, etching, polishing, placement of dielectric resin, high temperature pressing of resin, etc. Each circuit interconnect layer or a power or ground plane is separated by a sheet of photosensitive resin. Laser drilling of the resin and an electroplating process are used to fabricate vias that help connect various conductive (metal) layers. Multi-stack vias are often used to link conductive layers that are further apart within the build layers of a substrate.

The build layers between the IC die and the core are generally referred to as "FC" front circuit) layers, and the layers on the opposite side of the core are generally referred to as "BC" (bottom circuit) layers. Since each metal layer is designed to optimize electrical performance, the mechanical characteristics of each metal layer is not precisely controlled. The FC layers generally have a dense interconnect structure made of metal lines, typically etched from a layer of copper deposited by means of a plating process. The BC layers, on the other hand, tend to have a continuous sheet of copper with distributed holes for vias to pass through. Such a configuration inevitably leads to a substrate with asymmetric thermomechanical properties when viewed with respect to a center plane of the core.

A substrate design with asymmetric thermo-mechanical properties produces a warp when it is constructed at high temperature and cooled down to room temperature. Work by L. Valdevit et al., *Microelectronics Reliability* 48 (2008) p. 245-260, published by Elsevier Ltd., the disclosure of which is incorporated herein by reference, provides a thermo-mechanical model that accounts for heterogeneity and anisotropy of an organic chip board design file representative of an organic chip carrier (substrate). In this model, standard laminate plate theory is considered in the calculation of Young's moduli, Poisson's ratio and coefficients of thermal expansion of an organic chip carrier to predict warp. Preliminary warp prediction of a flip-chip (C4) organic chip carrier is presented.

Electronic manufacturing and assembly operations incorporating a substrate typically require the substrate to exhibit a warp that is within a minimum acceptable range. For example, for a substrate with 55×55 millimeter (mm) dimensions in an x-y plane, a warp of up to about 100 μm is typically considered acceptable. As the number of buildup layers and core thicknesses are changed, the warp levels can change according to their interaction with one another. The yield of substrates can be undesirably reduced if thermomechanical parametric symmetry (e.g., coefficient of thermal expansion (CTE), modulus, etc.) is not maintained within corresponding limits.

SUMMARY OF THE INVENTION

Illustrative embodiments of the present invention provide techniques for accurate warp projection of an organic chip carrier (substrate). Embodiments of the invention circumvent the need for a laminate theory approach by launching a three-dimensional (3-D) description of the layers of an organic chip carrier or a laminate substrate. The present invention preferably facilitates a best representation of a "real" organic substrate without making any image related approximations.

Aspects of the invention convert a two-dimensional (2-D) layer of an organic chip carrier board design file into a geometry compatible with a finite element method (FEM) model, wherein the geometry is a FEM-compatible 3-D object. An accurate 2-D representation of each tile is converted into a thin (e.g., typically about 15 μm in thickness) 3-D layer through a geometric extrusion process capturing the processes of electroplating and etching of a copper layer comprising part of the organic chip carrier. Further aspects of the invention then assembles the extruded chip carrier design patterned copper (with resin embedded) or resin layers (e.g., typically about 30-40 μm in thickness with microvias included) into a 3-D "tile." The tile geometry is then subjected to numerical operations that closely simulate an actual measurement process required to obtain thermomechanical properties of a tile. The required orthotropic material property of each tile is then assembled to form the full chip carrier in order to predict warp (deformation) by a warp predictor tool, or to be used in an alternative application (e.g., stress analysis). Various levels of approximations can be made in this illustrative method depending on the desired requirements of speed of thermomechanical parameter computation versus accuracy of thermo-mechanical parameter computation.

In accordance with one aspect of the invention, a method of characterizing an organic substrate including a plurality of circuit layers is provided. The method includes the steps of: receiving an image of the substrate, the image including a geometric description of the circuit layers of the substrate; selecting a given one of the circuit layers for processing; converting the image to a 2-D FEM image of the given circuit layer; repeating the steps of selecting a given one of the circuit layers and converting the image to a 2-D FEM image of the selected layer until all of the layers have been processed; combining all of the 2-D FEM images corresponding to the layers to form a 3-D FEM image representing at least a portion of the substrate; determining a CTE, modulus and/or Poisson's ratio of the 3-D FEM image; and constructing a 3-D representation of the substrate as a function of the CTE, modulus and/or Poisson's ratio of the 3-D FEM image.

In accordance with another aspect of the invention, an apparatus for characterizing an organic substrate including a plurality of circuit layers includes a memory and at least one processor coupled to the memory. The processor is operative: to receive a 2-D circuit layer image corresponding to a selected one of the plurality of circuit layers of at least a portion of the organic substrate, the 2-D circuit layer image including a geometric description of the selected one of the plurality of circuit layers of the substrate; to generate a 3-D FEM circuit layer image of at least a portion of the substrate as a function of the received 2-D circuit layer image; to repeat steps of receiving the 2-D circuit layer image and generating the 3-D FEM circuit layer image until all of the plurality of layers in the at least a portion of the substrate have been processed; to combine all of the 2-D FEM images corresponding to the respective circuit layer images to form a 3-D FEM image representing the at least a portion of the substrate; to determine at least one of a CTE, modulus and Poisson's ratio of the 3-D FEM image; and to construct a 3-D representation of the at least a portion of the substrate as a function of at least one of the CTE, modulus and Poisson's ratio of the 3-D FEM image.

These and other features, objects and advantages of the present invention will become apparent from the following detailed description of illustrative embodiments thereof, which is to be read in connection with the accompanying drawings.

DETAILED DESCRIPTION OF THE INVENTION

The present invention will be described herein in the context of illustrative methodologies using 3-D FEM for improving the prediction of warp in an organic chip carrier or substrate. Embodiments of the invention divide the substrate into a plurality of "tiles" and then generate a 3-D FEM geometry for each tile from 2-D images respective circuit layers of the tile. This methodology mimics an actual substrate manufacturing process, and facilitates an enhanced representation of a real organic substrate without making any image related approximations. It is to be appreciated, however, that the techniques of the present invention are not limited to the specific methods and application shown and described herein. Rather, embodiments of the invention are directed broadly to improved techniques for generating a more accurate thermo-mechanical model representing a circuit structure.

While techniques of the present invention are described herein with specific reference to substrate warp prediction, it is to be appreciated that these techniques are not limited to such an application. Instead, embodiments of the invention may be well-suited for other applications, including, but not limited to, stress analysis of a substrate or other circuit structure. For this reason, numerous modifications can be made to the embodiments described herein, including, for example, elimination of one or more steps in an illustrative embodiment of the invention, and the results will still be within the scope of the invention. No limitations with respect to the specific embodiments described herein are intended or should be inferred.

An organic substrate essentially comprises non-uniformly patterned metal layers, usually fabricated of copper. As used herein, the term "copper" may be used interchangeably with the term "metal," although it is to be understood that the metal or copper structures may alternatively be formed of other conductive materials, and that such materials are within the scope of the present invention. By segmenting an organic substrate into a finite number of "tiles," as shown, for example, in FIG. 1, the distribution of the metal parameters in an x,y plane can be captured. Each tile preferably includes layers that represent copper circuit layers or resin layers (or other dielectric layers) used to separate two adjacent copper circuit layers.

Figure 1:
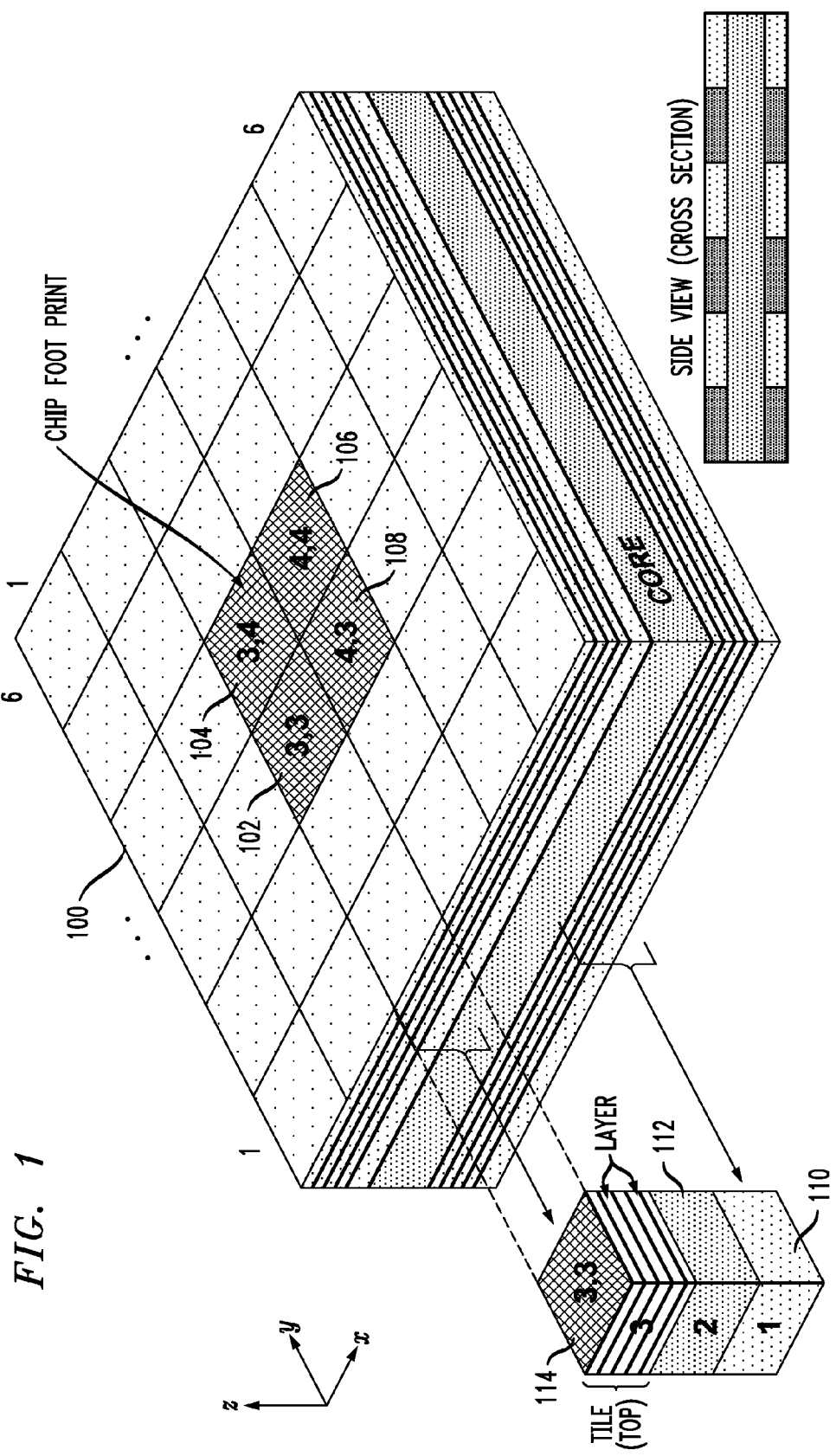
FIG. 1 is an isometric view depicting an exemplary organic substrate segmented into a plurality of tiles for prediction model generation, in accordance with an embodiment of the present invention.

FIG. 1 is an isometric view depicting an exemplary organic substrate structure 100. The substrate 100 is segmented into 36 tiles arranged in a 6×6 array (e.g., six rows in an x-direction and six rows in a y-direction). A given tile may be arbitrarily assigned a unique x,y position in the array. For example, tile 102 may be designated as tile 3,3, since it is located at x position 3, y position 3. Similarly, tile 104 may be designated as tile 3,4, tile 106 may be designated as tile 4,4, and tile 108 may be designated as tile 4,3. In a preferred embodiment, the substrate 100 is divided into 12×12 equal size tiles. As the number of tiles into which the substrate 100 is divided is decreased, the amount of memory required to store all of the geometry-related parameters associated with a given tile increases accordingly, since the number of circuit features (geometries) within the given tile generally increases with tile size. It is to be appreciated, however, that the invention is not limited to any specific number of tiles into which the substrate 100 may be divided. Furthermore, a footprint of any given tile need not be square (as shown), but rather may be rectangular.

Each x,y zone preferably includes three tiles in a z direction (e.g., cross section), namely, a first tile 110, which may include all bottom circuit (BC) layers, a second tile 112, which may represent a core, and a third tile 114, which may include all front circuit (FC) layers. Each of the designated circuit layers 110 and 114 may, itself, include multiple layers, as shown. More particularly, each of the tiles 110 and 114 preferably forms a sandwich structure including a plurality of circuit layers, with a dielectric insulating layer formed between any two adjacent circuit layers for electrically isolating the circuit layers from one another. Tile 112, which represents the substrate core, may also comprise multiple layers made of copper and a dielectric material. The invention is not limited to any specific number of circuit layers and/or core layers forming the substrate 100.

Figure 2:
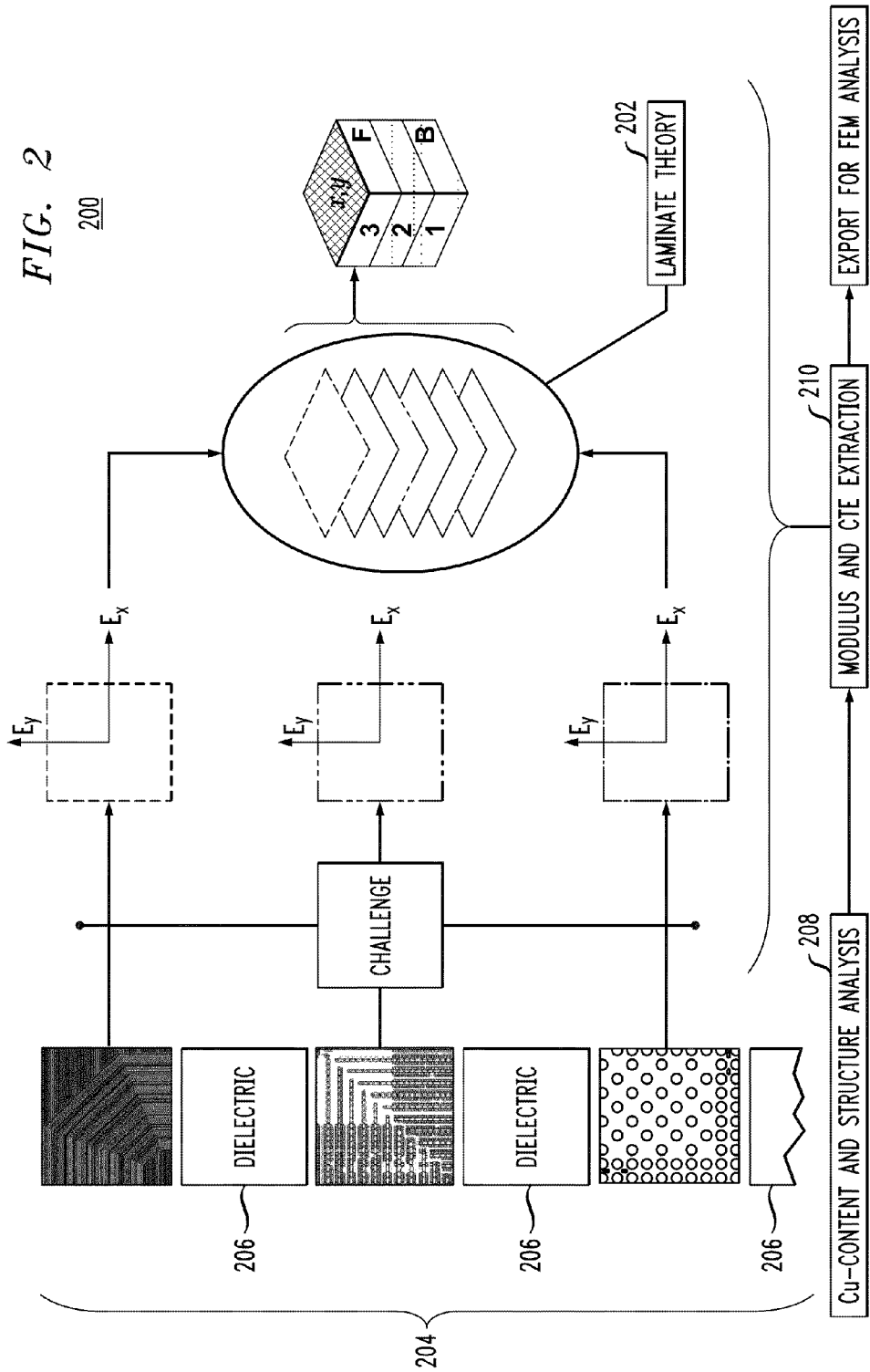
FIG. 2 is a conceptual view depicting an exemplary method of applying principles of laminate theory to obtain "tile" thermo-mechanical properties of an organic substrate for finite element model analysis.

FIG. 2 is a conceptual view depicting an exemplary method 200 of applying principles of laminate theory 202 to obtain thermomechanical properties for each tile of an organic substrate for FEM analysis. Method 200 preferably provides a systematic approach to developing a warp projection model using principles of laminate theory. Laminate theory, in the general sense, has been employed to study products having multiple layers of material joined together. However, a restriction in conventional applications of laminate theory is that each of the layers be formed using a uniform structure. For example, a cross-ply laminate structure (e.g., consisting of an arbitrary number of layers of the same material and thickness but with alternating orientations of 0° and 90°) formed using fiber-reinforced plastic, can be analyzed using existing tools. An organic substrate, in contrast, is comprised of multiple layers 204, but with each circuit layer having highly non-uniform circuit patterns. Dielectric layers 206 may be treated as being substantially uniform. Hence, in applying principles of laminate theory to an organic substrate, one challenge is in converting the complex organic substrate structure into an equivalent orthotropic representation so that subsequent warp model building can be undertaken.

As part of a circuit pattern identification process, once a decision on tile size is made, a key challenge is in developing a methodology to identify copper patterns using, for example, image processing techniques. Once the 2-D structure of a layer in the substrate is determined (e.g., step 208), each 2-D layer is individually processed using FEM analysis and the thermomechanical parameters of each 2-D layer are extracted. The thermomechanical parameters (e.g., CTE, modulus, Poisson's ratio, etc.) corresponding to each layer may be extracted (e.g., in step 210), for example, from analytical expressions or from stored parametric curves (e.g., look-up tables) generated through analysis of the circuit layers prior to application of the principles of laminate theory. The respective 2-D layers, and the thermomechanical parameter information corresponding thereto, are then combined, using principles of laminate theory, to form a 3-D model representation of a given tile.

Unfortunately, since thermomechanical parameters are extracted individually for each 2-D layer, without consideration of the other layers in the tile, interactions between the individual circuit layers cannot be taken into account in generating the 3-D model using this approach. In accordance with other embodiments of the invention, a 3-D FEM analysis is preferably performed on a given tile of the organic substrate, and thermomechanical parameters are extracted from the 3-D tile. This approach eliminates the need for an application of laminate theory in generating the 3-D model representation of the tile. Furthermore, since the thermomechanical parameter extraction is performed on the 3-D structure, interactions between the respective layers can be advantageously incorporated into the 3-D model of the tile. Inclusion of microvias in the dielectric layer that is sandwiched between circuit layers can further enhance the accuracy of the 3-D FEM model of a tile.

Figure 3:
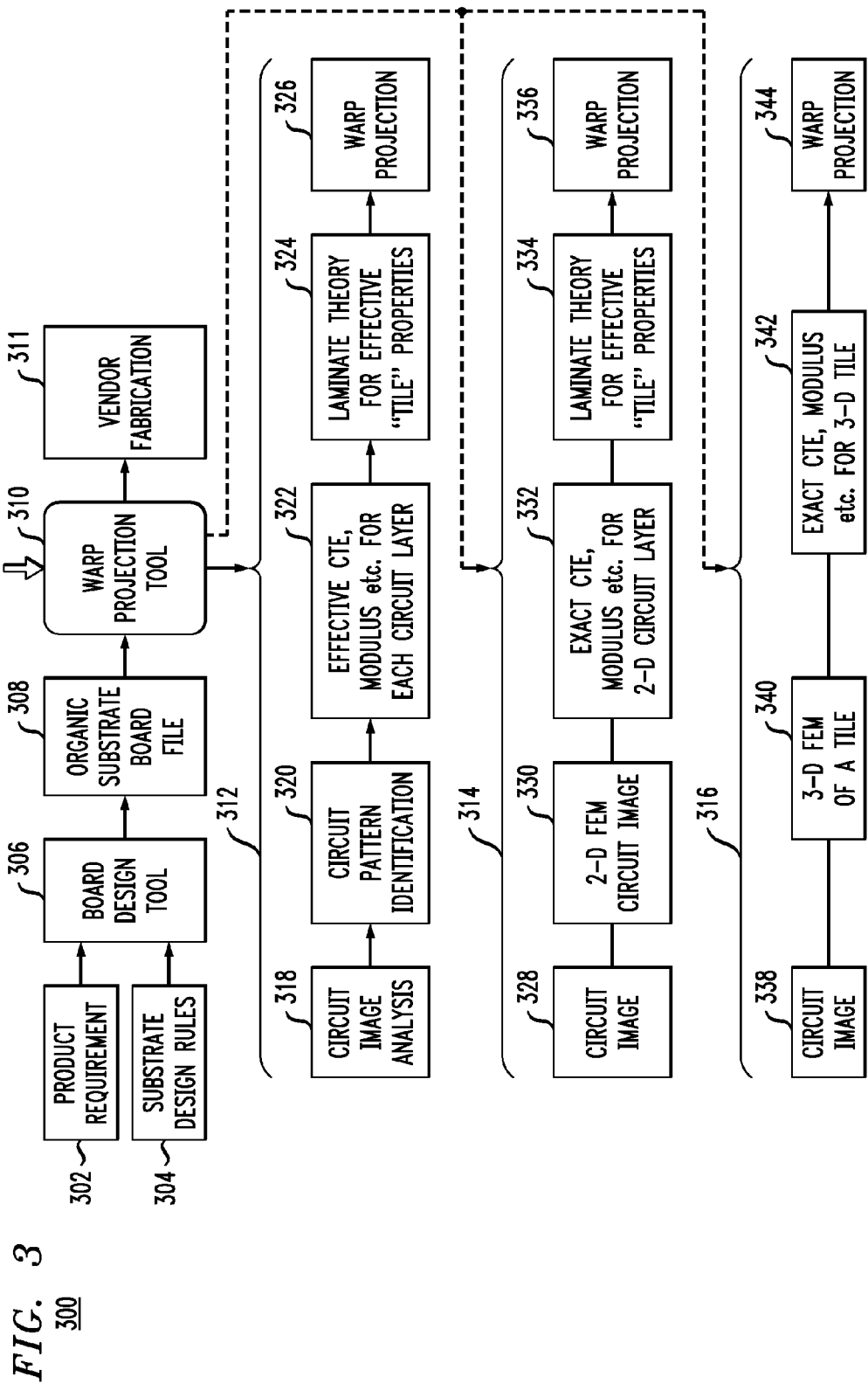
FIG. 3 is a conceptual block diagram depicting an exemplary substrate design process including three alternative warp projection methodologies, in accordance with embodiments of the present invention.

FIG. 3 is a flow diagram depicting an exemplary substrate design method 300 including three alternative warp projection methodologies, 312, 314 and 316, according to embodiments of the invention. As apparent from the figure, product requirements 302 and substrate design rules 304 are incorporated by a board design tool 306 to generate an organic substrate board file 308. The product requirement, for example, may include chip size, number of input/output solder joints, thickness of the core, number of buildup layers. The design rules for substrate, for example, enforces minimum gap between adjacent circuit lines, number of microvias that can be stacked along z-direction, type of circuit patterns or voltage plane layouts that should be avoided. As previously explained, the board file includes, among other things, a geometric description of copper circuit layers and microvias included within the organic substrate. The board file 308 is supplied to a substrate warp projection (e.g., estimation) tool 310 to determine whether or not to allow the substrate design to proceed to vendor fabrication 311.

Warp projection tool 310 may be operative to perform multiple warp projection methodologies, such as, for example, a first illustrative warp projection method 312 providing a faster output result compared to a second illustrative warp projection method 314 or a third illustrative warp projection method 316, but at the expense of reduced accuracy. Generally, accuracy of the warp prediction model will be traded for computational time. For applications in which an enhanced level of warp prediction accuracy is required at the expense of a slight impact on computational speed, method 314 is preferably employed and method 312 can therefore be eliminated, or at least disabled. For applications in which an even higher level of accuracy is required, method 316 is preferably employed, and methods 312 and 314 can be eliminated or disabled. Likewise, for applications in which computational speed is critical and warp prediction accuracy can be compromised, method 312 is preferably used and methods 314 and 316 can be eliminated, or at least disabled. The invention contemplates that other warp prediction methodologies can be employed which provide a desired trade-off between computational speed and accuracy. In an embodiment of the invention, the particular warp projection methodology used is selectively activated as a function of one or more control signals. It is to be understood that the three methods 312, 314 and 316 can be selectively applied to specific tiles so that critical regions, for example, the zone under the chip footprint, are more accurately evaluated using 2-D (e.g., method 314) or 3-D FEM (e.g., method 316) analysis, while tiles near an edge of the substrate are evaluated with higher time efficiency using method 312.

First warp projection method 212 includes a circuit image analysis step 318 followed by a circuit pattern identification step 320. Circuit image analysis 318 may include, for example, obtaining an image of the organic substrate structure (e.g., from a board file or alternative geometric description file) and segmenting the organic substrate into a plurality of tiles based, at least in part, on x,y coordinates of circuit structures defined in the board file or alternative geometric description file.

Based on the circuit pattern identification information generated in step 320, one or more parameters (e.g., effective CTE, modulus, etc.) are determined in step 322 for each layer of the organic substrate. Based on principles of laminate theory, and using computed parameters (e.g., stored in look-up tables, etc.) corresponding to the various tile layers, a 3-D model representing the substrate is constructed for each tile in step 324. The 3-D model is then used in step 326 to determine a warp projection for the organic substrate. This warp projection may be used in determining whether or not to allow a substrate design to proceed to fabrication.

Figure 4:
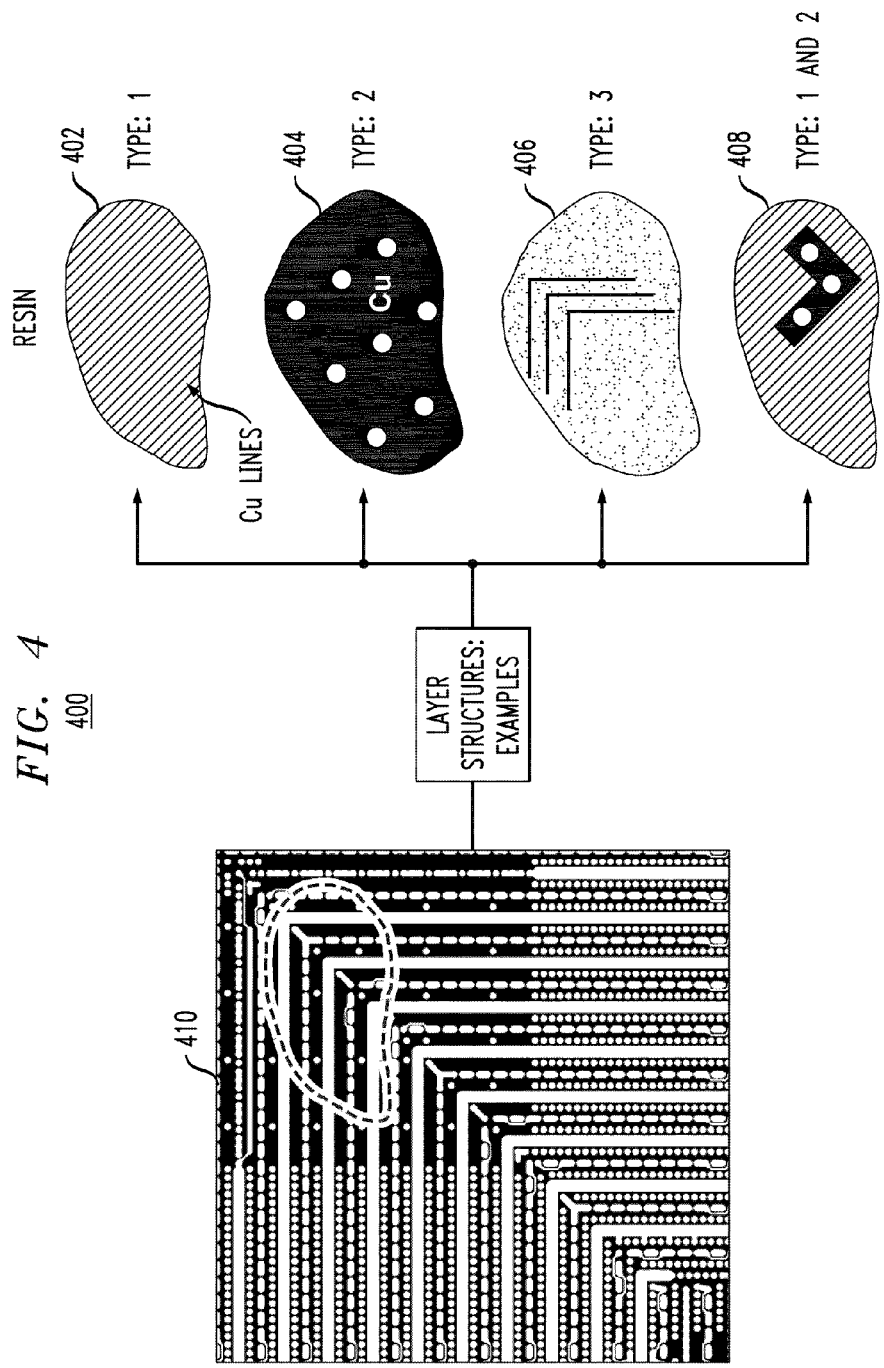
FIG. 4 depicts an exemplary process for identifying structures in a tile of an organic substrate, in accordance with an embodiment of the present invention.

As part of the circuit pattern identification process (e.g., step 320 in FIG. 3), once a decision on tile size is made, a key challenge is in developing a methodology to identify copper patterns using, for example, image processing techniques. FIG. 4 conceptually illustrates an exemplary process 400 for identifying structures in a tile of an organic substrate, according to an aspect of the present invention. For example, a subset of exemplary patterns, 402, 404, 406 and 408, found in at least a portion of a circuit layer 410 are shown. By way of example only, patterns 402, 404 and 406 may exhibit arbitrarily designated type 1, 2 and 3 patterns, respectively, with an identifiable dominant feature, whereas pattern 408 exhibits multiple features (in this case, two) drawn from types 1 and 2 and may pose a challenge in identifying the circuit structure using an automated process. Thus, it is advantageous to circumvent the need to identify complex features of a given circuit layer.

Figure 5:
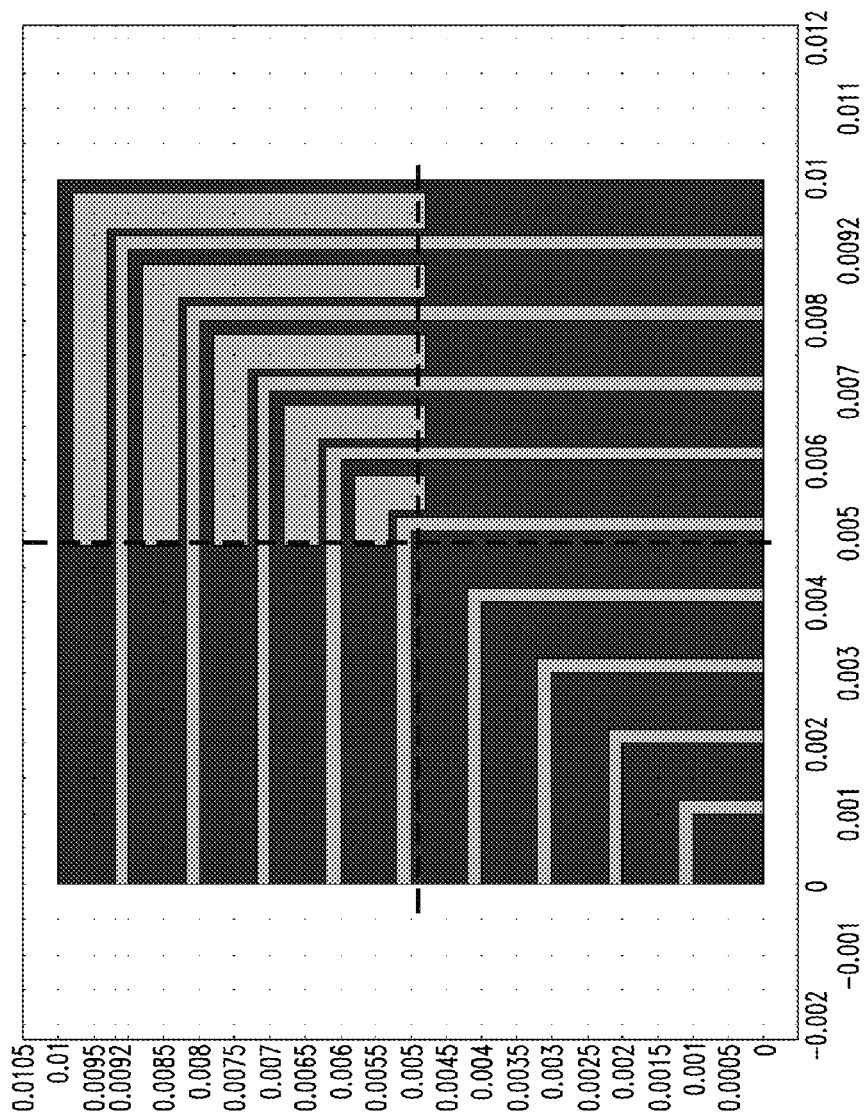
FIG. 5 is a top plan view depicting at least a portion of one type of structural pattern in an exemplary circuit layer of an organic substrate, in accordance with an embodiment of the present invention.

Preferably, the structure of a layer in the substrate is first determined, and then the thermomechanical parameters (e.g., CTE, modulus, Poisson's ratio, etc.) corresponding to the structure are extracted. Such thermomechanical parameters may be extracted from analytical expressions or from stored parametric curves (e.g., look-up tables) generated through analysis of the circuits prior to application of the principles of laminate theory. For example, FIG. 5 illustrates a simplified representation 500 of a type 3 pattern geometry corresponding to the exemplary pattern 406 shown in FIG. 4. The type-3 pattern, referred to as a "chevron," is known to produce a large CTE and low modulus, and hence is of more interest. The chevron geometry 500 can be reproduced in a FEM analysis environment and the thermomechanical properties can be approximated using methodologies known by those skilled in the art. For the circuit pattern 402 in FIG. 4, when the lines are horizontally oriented, the effective modulus in the horizontal direction can be computed using, for example, a mixing law for modulus: fraction of copper area*modulus of copper+ fraction of resin*modulus of resin. However, more complex patterns will likely require more sophisticated analytical methods or off-line FEM analysis.

Figure 6:
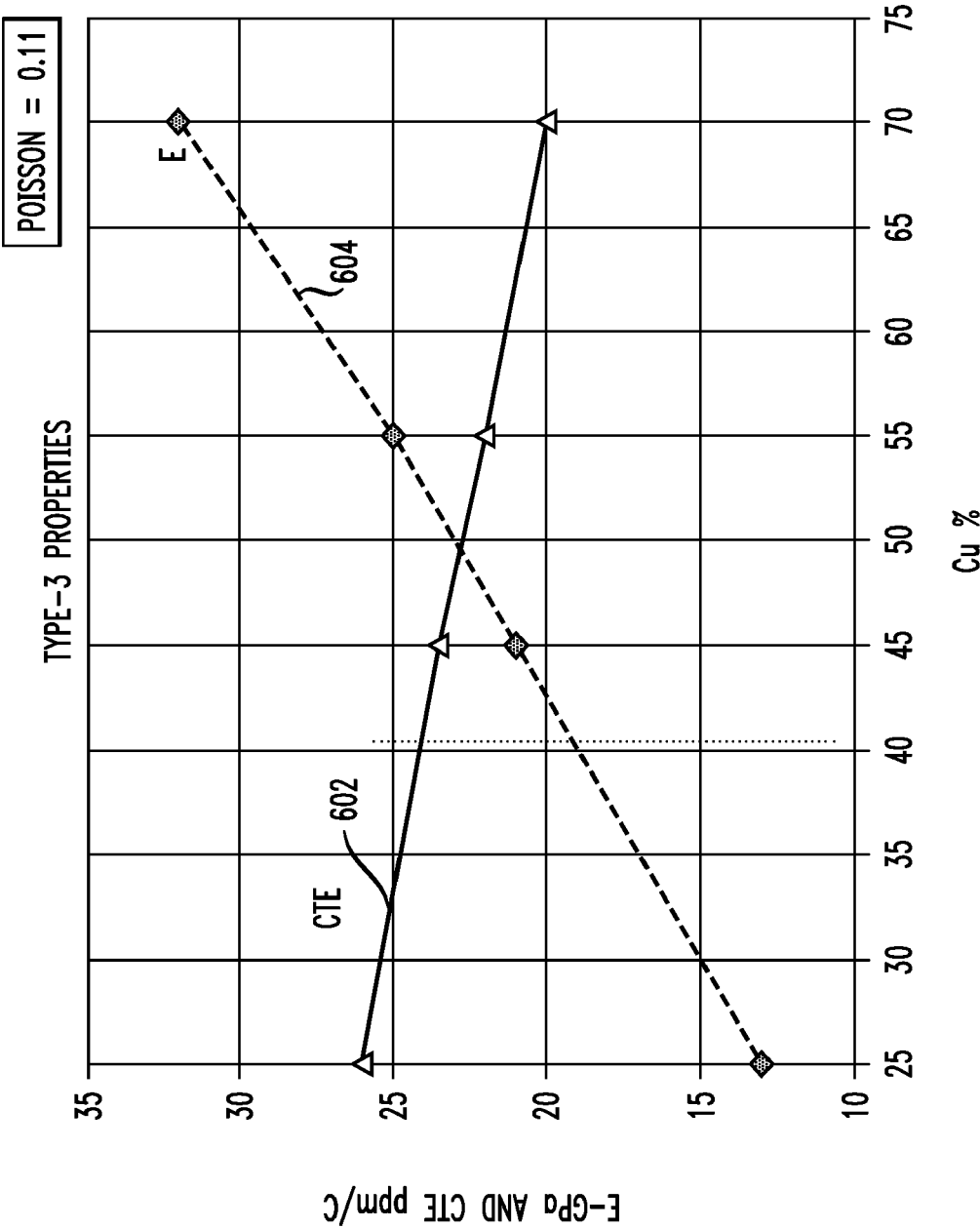
FIG. 6 is a graph depicting an exemplary parametric curve for a structural pattern of the type shown in FIG. 6, in accordance with an embodiment of the present invention.

FIG. 6 is a graph 600 depicting exemplary parametric curves 602 and 604 obtained, for example, using offline FEM analysis for the chevron structural pattern type-3 (e.g., 406 in FIG. 4) shown in FIG. 5. Parametric curves 602 and 604 may be obtained, for example, by analyzing the simplified geometry pattern 500 (FIG. 5) beforehand (e.g., offline), prior to an application of laminate theory, for multiple levels of copper percentage. Curve 602 is indicative of CTE for the geometry, in parts-per-million per degree Celsius (ppm/° C.) as a function of the percentage of copper in the geometry. Curve 604 is indicative of modulus (E), in gigapascal (GPa), as a function of copper percentage in the geometry.

With reference again to FIG. 3, a limitation of the first warp projection method 312 is that complex circuit images are confined to fit into a finite number of predetermined patterns, referred to as templates (see, e.g., FIG. 4). Therefore, the parameter estimation error due to image approximations can accumulate over each layer as well as for each tile, resulting in increased warp projection error. The second warp projection method 314 beneficially provides an improved technique which circumvents image template-based warp estimation, and thereby enhances accuracy of the resulting warp projection model.

According to the second warp projection method 314, a circuit image of the organic substrate is preferably generated in step 328. The organic substrate is typically comprised of non-uniformly patterned metal layers, usually made of copper (referred to interchangeably with metal). Many conventional approaches to estimating warp of an organic substrate employ significant approximations, such as assuming each circuit layer in the substrate to be formed of a homogeneous material, thereby inherently introducing undesirable inaccuracies into the warp prediction model. The circuit image step 328 may include, for example, obtaining an image of the organic substrate from a board file, a bitmap image, or an alternative geometric description file, segmenting the organic substrate into a plurality of tiles, or alternative regions (as noted above), and determining whether a given layer in the substrate is comprised primarily of patterned lines and/or geometric shapes, in the case of a circuit layer, or is substantially solid, in the case of, for example, a dielectric isolation layer formed between adjacent circuit layers in the substrate. In alternative embodiments, the circuit image may be stored in memory (e.g., as a net file) and provided directly to a subsequent processing block (e.g., FEM conversion block 330), in which case at least a portion of step 328 may be omitted. By segmenting the organic substrate into a finite number of tiles, as shown in FIG. 1, the variable distribution of metal parameters in an x,y plane can be captured.

In step 330, each distinct layer of the circuit image corresponding to the organic substrate is converted to a 2-D FEM representation of the circuit image. This can be accomplished, for example, using a FEM geometry generator, or alternative processor. As previously stated, the circuit image may comprise a bitmap image of the organic substrate obtained, for example, from a board file or alternative geometric description of the organic substrate structure.

An exemplary FEM geometry generator, in which one or more functions of step 330 may be implemented, preferably receives, as input, geometric descriptions having clearly defined line boundaries, in this case, copper boundaries, to generate an object. Hence, a generic bitmap of a circuit layer should not be unconditionally imported into a FEM geometry generator and expect the FEM geometry generator to determine the copper regions and resin regions, alternatively referred to herein as domains.

There are commercially available programs that can be utilized to translate bitmap images to formats that a FEM program can understand. One widely used program suitable for translating bitmap images to a FEM-compatible format is Drawing Exchange Format (DXF), or derivatives thereof (e.g., data exchange file, structured DXF (SDXF), etc.). DXF is a computer aided design (CAD) data file format originally developed by Autodesk, Inc. for enabling data interoperability between AutoCAD®, a registered trademark of Autodesk, Inc., and other programs. The software translator detects the edges of bitmap objects and draws line segments representing boundaries. This works fine for CAD drawings, but for FEM, all features inside a given boundary are treated as homogeneous, and thus internal details are effectively lost. For example, a circular ring structure would be seen as a solid disk, where the center hole is automatically filled by the FEM geometry builder.

To circumvent this problem, for each cross-sectional layer in a tile of the substrate, the bitmap image is preferably rasterized by dividing the image into a plurality of slices taken along at a given direction (e.g., x-direction) as part of the functionalities of step 330. These slices are imported into the FEM geometry generator in obtaining the 2-D FEM circuit image. Image construction accuracy is dependent, at least in part, on slice thickness. With very thin slices (e.g., less than about 10 μm), substantially all features in the original bitmap image are preserved, but there are more slices to process, thereby increasing computation time and memory storage requirements. Thus, there is a trade-off between image accuracy and computation time and storage size.

Once the geometric features in a given layer of a tile are captured (e.g., in step 330), one or more thermomechanical parameters of the layer can be computed in step 332, such as by employing an analytical process. For example, in order to predict the amount of substrate warp, a CTE of each layer in the tile is preferably computed. An accuracy of the warp projection model generated by method 314 can be increased, according to aspects of the invention, by avoiding simplifying assumptions and approximations made in extracting the thermomechanical parameters of a given tile layer. Thus, aspects of the invention provide a technique for automating the extraction of thermomechanical parameters of a layer directly from the original bitmap image, or alternative geometric description file, of a circuit layer so that image-related approximations can be beneficially avoided.

After the thermomechanical properties of the circuit layer have been determined in step 332, the second warp projection method 314 preferably proceeds to utilize principles of laminate theory, or an alternative processing technique, in step 334 to effectively construct a given 3-D tile of the substrate from the individual 2-D circuit layers associated with the given tile. Step 334 may be consistent with step 324 described above. After all of the tiles have been processed, a warp projection result for the organic substrate is generated in step 336. This result may subsequently be used to predict whether or not the organic substrate will exhibit a warping that meets a prescribed threshold value. Illustrative embodiments of the second warp projection method 314 have been described in a commonly owned patent application Ser. No. 12/260,693 entitled "Characterizing Thermomechanical Properties of and Organic Substrate Using Finite Element Analysis" filed on even date herewith, the disclosure of which is incorporated herein by reference. Accordingly, further details of the second warp projection method 314 will not be presented herein.

The third warp projection method 316 preferably eliminates an application of principles of laminate theory in generating a 3-D representation of a given tile of the organic substrate. To accomplish this, method 316 obtains a 2-D circuit image of a tile of an organic substrate in step 338 and advantageously builds a 3-D FEM image structure as each 2-D circuit image layer is imported in step 340. Once the 3-D FEM image structure of the tile is generated, 3-D thermomechanical parameter extraction is performed on the 3-D FEM image structure in step 342 and a warp projection is generated in step 344 as a function of the extracted thermomechanical parameter(s). Using this approach, detailed interaction between adjacent layers of the tile can be taken into account and incorporated into the 3-D FEM model representation of the tile, thereby improving the accuracy of the thermomechanical property estimation (e.g., warp projection, stress analysis, etc.).

Embodiments of the invention present a method to automate the generation of orthotropic parameters of a selected tile of an organic substrate instead of a layer by circumventing two intermediate steps (e.g., 322, 324) required in the first warp projection method 312 shown in FIG. 3. By using a 2-D image of a layer, the method constructs an extruded 3-D FEM circuit layer from a 2-D FEM circuit layer image that accurately reflects the geometry of the layer. By repeating this process for each layer within the tile, a complete 3-D stack is built within an FEM geometry builder. Once the geometry is established, a 3-D FEM operation is performed to compute effective orthotropic parameters of the selected tile.

Figure 7:
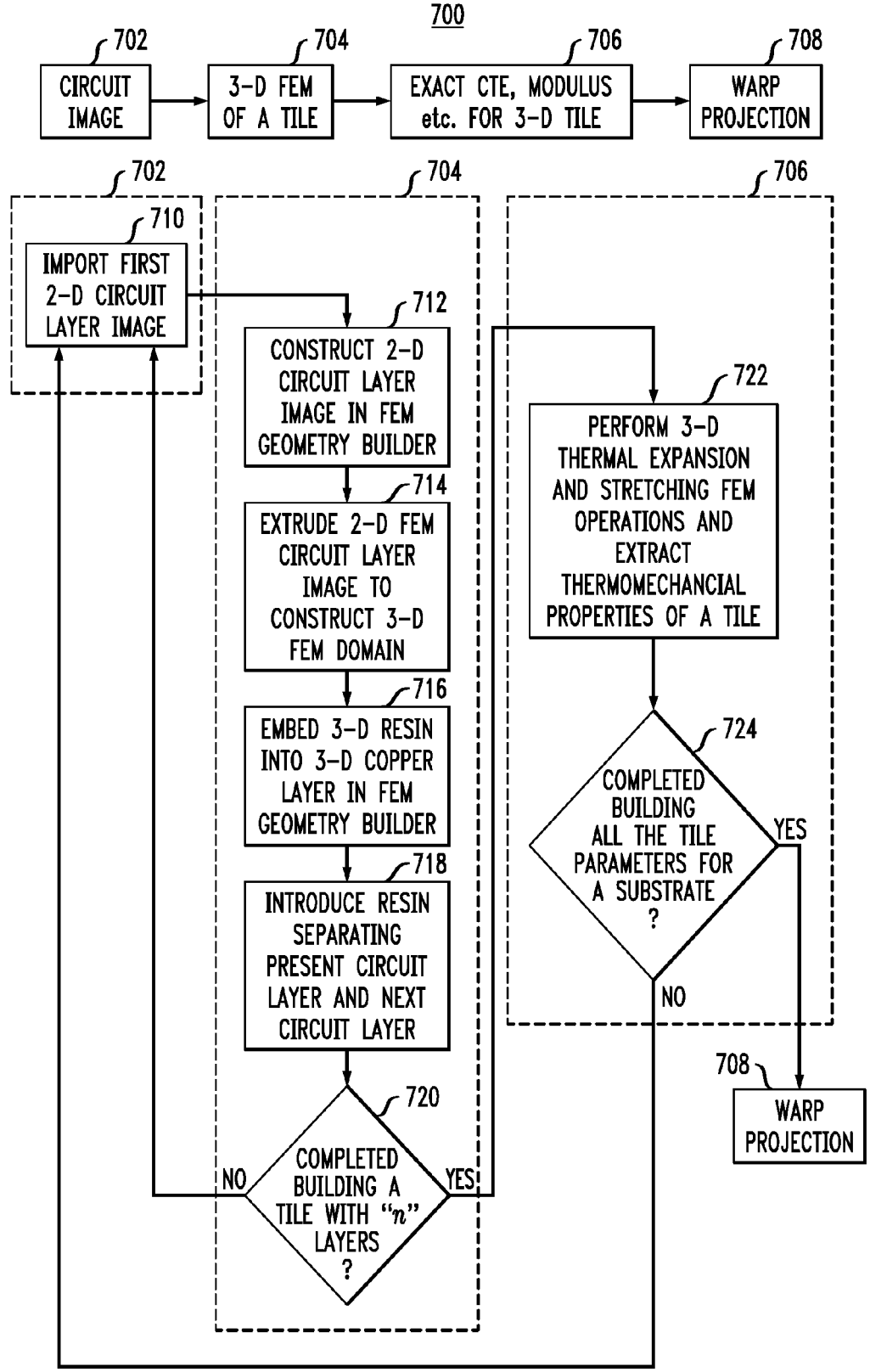
FIG. 7 is a flow diagram depicting an exemplary method for generating tile parameters of an organic substrate using 3-D geometry obtained from a 2-D layer, in accordance with an embodiment of the present invention.

FIG. 7 is a flow diagram depicting an exemplary method 700 for generating orthotropic tile parameters of a selected tile of an organic substrate using 3-D FEM geometry obtained from a 2-D FEM image of a circuit layer in the tile, according to an embodiment of the invention. Method 700 preferably represents one embodiment of the illustrative warp projection method 316 depicted in FIG. 3, although the invention contemplates that other methods consistent with the teachings herein may be similarly employed.

Method 700 begins in functional block 702 by obtaining a circuit image of the organic substrate. The circuit image block 702 may include, for example, one or more steps of receiving an image of the organic substrate from a board file, a bitmap image, or an alternative geometric description of the substrate, segmenting the substrate into a plurality of tiles or alternative regions (as noted above), and determining whether a given layer in the substrate is comprised primarily of patterned lines and/or geometric shapes, in the case of a circuit layer, or is substantially solid, in the case of, for example, a dielectric isolation layer formed between adjacent circuit layers in the substrate. In alternative embodiments, the circuit image may be stored in memory (e.g., as a net file) and provided directly to a subsequent processing block (e.g., 3-D FEM analysis block 704), in which case at least a portion of block 702 may be omitted. Block 702 may comprise, in step 710, importing a first (i.e., current) 2-D circuit layer image, for example, from one or more of the above-identified sources (e.g., bitmap image, net file, etc.).

Segmenting the organic substrate into a finite number of tiles (e.g., 6×6 or 12×12 array), as shown in FIG. 1, and processing one tile at a time lessens the required memory overhead by reducing the number of thermomechanical parameters and/or geometric features that are subsequently extracted and stored during a given processing cycle. In alternative applications, such as, for example, in a multiprocessor environment, it may be beneficial to compute 3-D FEM circuit layer images for all tiles (e.g., concurrently) prior to performing thermomechanical parameter extraction. This would enable a designer to take into account and incorporate into the 3-D model the interaction between adjacent tiles, in addition to the interaction between adjacent cross-sectional layers, to thereby increase the accuracy of warp and/or other thermomechanical property characterizations.

Figure 8:
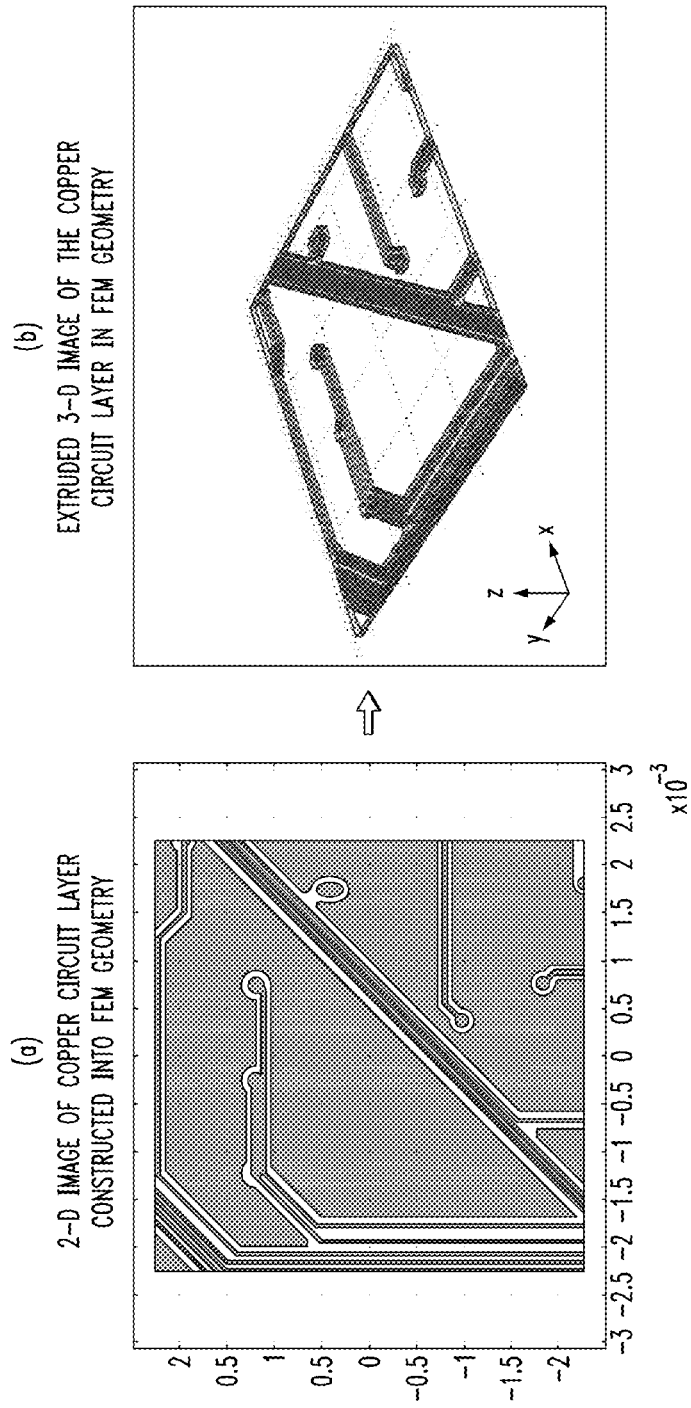
FIGS. 8A and 8B depict an exemplary 2-D FEM image of a copper domain of a circuit layer in an organic substrate and a corresponding extruded 3-D FEM image of the circuit layer, respectively, in accordance with an embodiment of the present invention.

In block 704, a 3-D FEM circuit layer image of the tile is constructed. This may be accomplished using, for example, a 3-D FEM geometry builder or an alternative processor operative to construct a 2-D circuit layer image in the FEM geometry builder from a received 2-D circuit layer image (step 712), and to extrude the 2-D FEM circuit layer image to generate a 3-D FEM domain (e.g., copper domain) in step 714. FIGS. 8A and 8B depict an exemplary 2-D FEM image of a copper domain of a circuit layer in an organic substrate and a corresponding extruded 3-D FEM image of the circuit layer, respectively, in accordance with an aspect of the invention. FIG. 8A illustrates a complex 2-D image of the circuit layer as it is imported into the FEM geometry builder. The 2-D image initially reflects copper content only (or an alternative conductive material). FIG. 8B illustrates an extruded 3-D image along the z-axis, thus creating a true 3-D copper circuit layer with a prescribed thickness.

Figure 9:
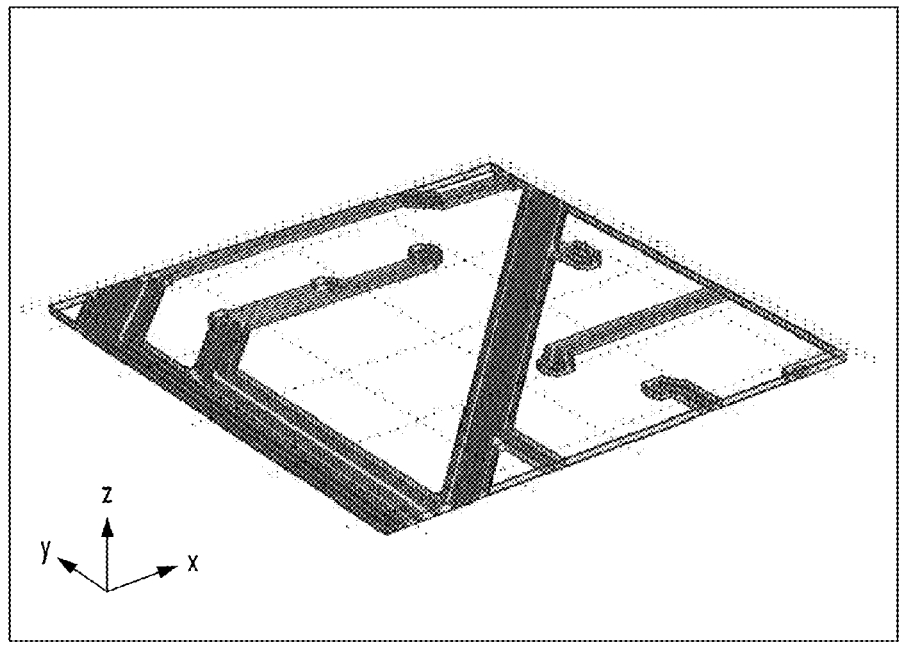
FIG. 9 is an isometric view depicting the exemplary 3-D FEM of the circuit layer shown in FIG. 8B with embedded resin into the layer, in accordance with an embodiment of the present invention.

Next, with continued reference to FIG. 7, 3-D resin (or alternative dielectric material) is embedded into the 3-D copper circuit layer in the FEM geometry builder in step 716. FIG. 9 is an isometric view depicting the exemplary 3-D FEM image of the circuit layer shown in FIG. 8B with resin embedded into the layer. Since resin will preferably be embedded wherever copper features are not present, a resin domain may be generated from the extruded copper circuit layer using, for example, Boolean operations (e.g., logical complement) of the copper circuit layer image shown in FIG. 8B. In step 718, a resin layer (or alternative dielectric layer) is introduced separating a current circuit layer (e.g., the layer currently being processed) and a next circuit layer (e.g., adjacent circuit layer image to be imported). This resin layer can include the presence of microvias for further accuracy.

The procedure for building the 3-D FEM image of the tile (e.g., steps 702 and 704) is preferably repeated until all n layers contained within a selected tile are processed, where n is an integer greater than one. More particularly, step 720 checks whether or not all n layers in the tile have been processed. When all n layers have not been processed, method 700 returns to step 710 in block 702 to import the next 2-D circuit layer image in the selected tile. When all n layers have been processed, and therefore block 704 has completed the 3-D FEM image of the tile, method 700 proceeds to block 706 to perform parameter extraction on the 3-D tile.

Figure 10:
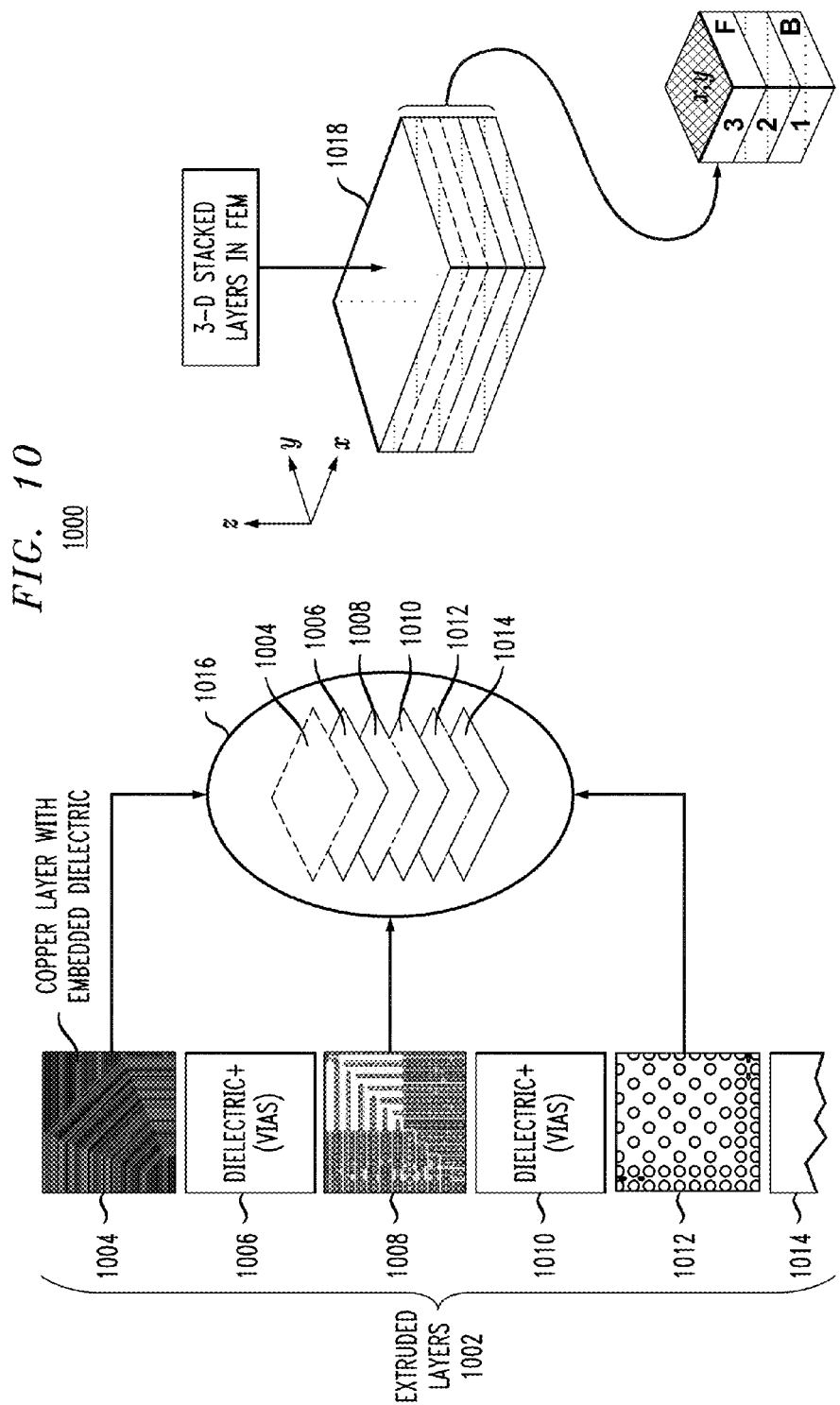
FIG. 10 is a conceptual view depicting an illustrative assembly methodology for generating a 3-D tile from respective 3-D layers in FEM, in accordance with an embodiment of the present invention.

FIG. 10 is a conceptual view depicting an illustrative assembly methodology 1000 for generating a 3-D FEM image of a tile from respective 2-D circuit layer images 1002 in a FEM environment, according to an embodiment of the invention. At least a portion of method 1000 may be implemented in one or more of blocks 702 and 704 shown in FIG. 7. FIG. 10 illustrates the exemplary assembly process in the FEM geometry builder where each layer, 1004, 1006, 1008, 1010, 1012 and 1014, is stacked according to their substrate buildup process 1016. Observe that one or more of the resin layers 1006, 1010 and 1014 can be represented, for simplicity, as an orthotropic layer with known properties, or else a given resin layer can be constructed in the same way as a circuit layer to incorporate the effects of conductive microvias formed within the resin. The completed 3-D FEM tile structure 1018 is also shown comprising the plurality of stacked extruded layers. In fabricating a substrate, the top and bottom circuit layers are typically protected by a layer called a solder mask, which is different from a resin, that confines the deposition of solder material in designated areas. The effect of the solder mask layer is handled preferably in the same manner as a resin layer, but with associated thermomechanical property and thickness.

As shown in the illustrative method 700 of FIG. 7, block 706 is preferably operative to perform 3-D thermomechanical parameter extraction on the 3-D FEM tile generated in block 704. Specifically, step 722 is preferably operative to perform numerical FEM solutions to two respective simulation methodologies. A first method comprises determining CTE of the tile along x, y and z directions in a single contraction (or expansion) solution. A second method comprises determining modulus (E) and Poisson's ratio (v). Important to a successful implementation of these methods is the selection of surfaces at which relevant boundary conditions are to be imposed.

CTE parameter extraction will be described with reference to FIGS. 11A through 11C, which are conceptual views depicting an exemplary methodology 1100 for determining a CTE of a 3-D tile, in accordance with an embodiment of the present invention. For CTE parameter extraction, only point boundary conditions are required. Rather than movement or displacement in two dimensions with lines, exemplary method 700 preferably performs surface movement in three dimensions, which requires a more complex computation. Thus, method 700 determines displacement of a surface as a function of temperature $\Delta T$ (in this instance, line integrals become surface integrals) to obtain average displacement.

Figure 11:
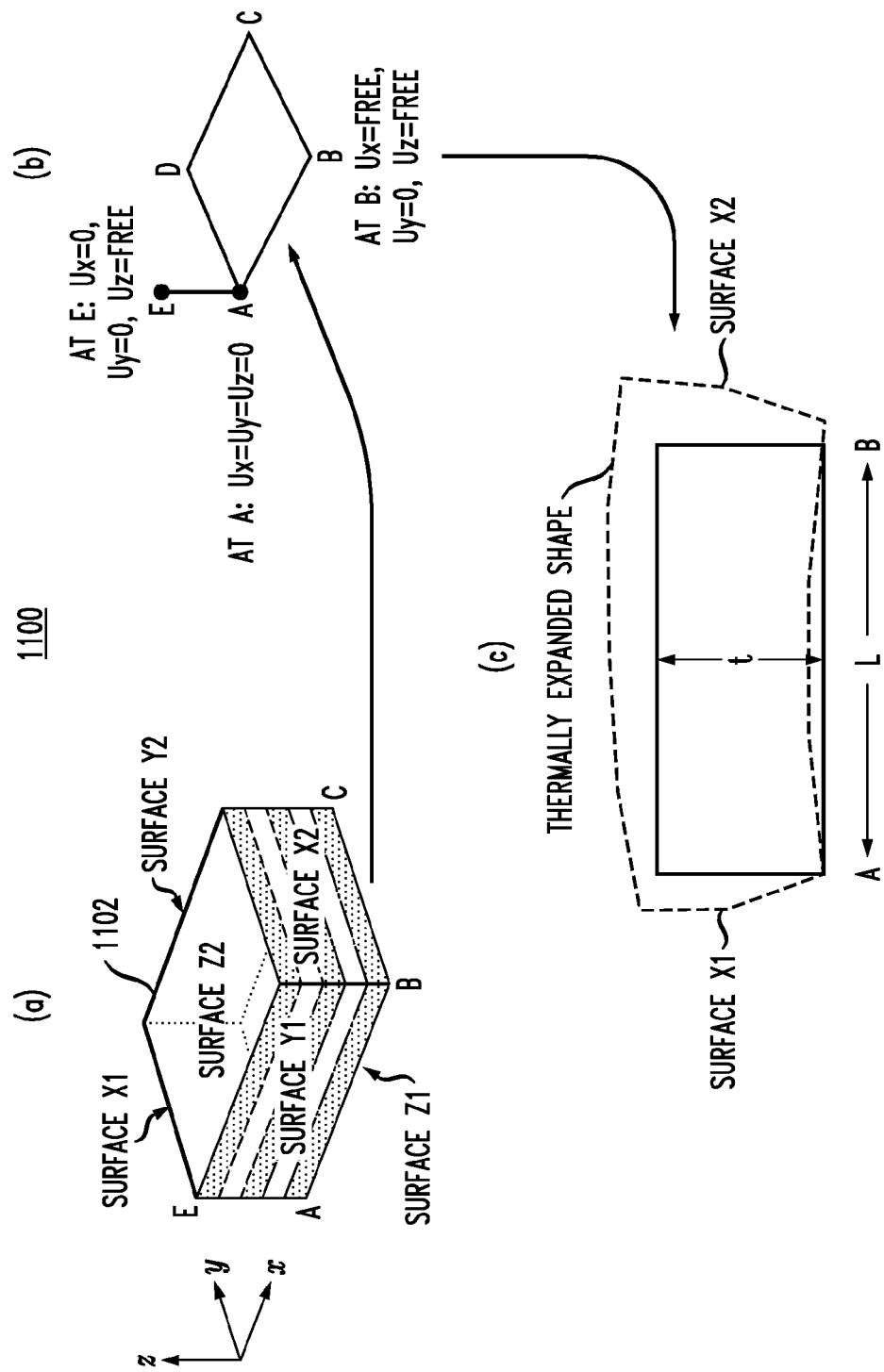
FIGS. 11A through 11C are conceptual views depicting an exemplary methodology for determining a coefficient of thermal expansion (CTE) of a 3-D tile, in accordance with an embodiment of the present invention.

FIG. 11A illustrates an arbitrary assignment of names to the six surfaces of the 3-D tile 1102, namely, surfaces X1, X2, Y1, Y2, Z1 and Z2. Alternative naming conventions may be similarly designated. As shown in FIG. 11B, the edges of tile 1102 are essentially free to move, and only a point (A) at the origin is held fixed. Thus, point A may be defined by the expressions Ux=Uy=Uz=0, where Ux, Uy and Uz represent displacement functions in the x, y, and z directions, respectively. Point E of tile 1102 is preferably allowed to move freely in the z direction but is constrained in the x and y directions (e.g., Ux=0, Uy=0, Uz=free). Point B of tile 1102 is preferably constrained in the y direction but is allowed to move freely in the x and z directions (e.g., Ux=free, Uy=0, Uz=free). By solving the thermal expansion (or contraction) FEM problem with the above boundary conditions for a temperature swing of, for example, about 100 degrees Celsius, the respective displacements of the six surfaces of tile 1102 (e.g., X1, X2, Y1, Y2, Z1, Z2) can be estimated.

Since the surfaces of the tile generally do not remain planer during the expansion process, a rational method is required to estimate the representative displacement of a boundary surface. Average displacement of the tile along the x, y and z axes are preferably estimated using following expressions.

$$\overline{U}_x = \frac{1}{Lt}\int_0^t\int_0^L U_x\, dy\, dz \quad (1)$$

$$\overline{U}_y = \frac{1}{Lt}\int_0^t\int_0^L U_y\, dx \quad (2)$$

$$\overline{U}_z = \frac{1}{L^2}\int_0^L\int_0^L U_z\, dx\, dy \quad (3)$$

$$\Delta\overline{U}_y = \overline{U}_{y(on\_surface\_Y2)} - \overline{U}_{y(on\_surface\_Y1)} \quad (4)$$

$$\overline{CTE}_y = \frac{\Delta\overline{U}_y}{L\cdot\Delta T} \quad (5)$$

For average displacement in the x direction, as defined by equation (1) above, integration is performed on surfaces X1 and X2 of tile 1102. For average displacement in the y direction, as defined by equation (2), integration is performed on surfaces Y1 and Y2 of the tile. Likewise, for average displacement in the z direction, as defined by equation (3), integration is performed on surfaces Z1 and Z2 of the tile.

The relative motion between two nearly parallel edges is simply the difference between corresponding average displacements. Hence, the elongation (or contraction) along the y-axis, for example, may be given by equation (4), and the corresponding CTE along the y-axis for a temperature difference of $\Delta T$ may be given by equation (5). In the above equations, the parameter "L" represents a side length of a square representing the layer area and the parameter "t" corresponds to layer thickness. This is illustrated conceptually in FIG. 11C.

Figure 12:
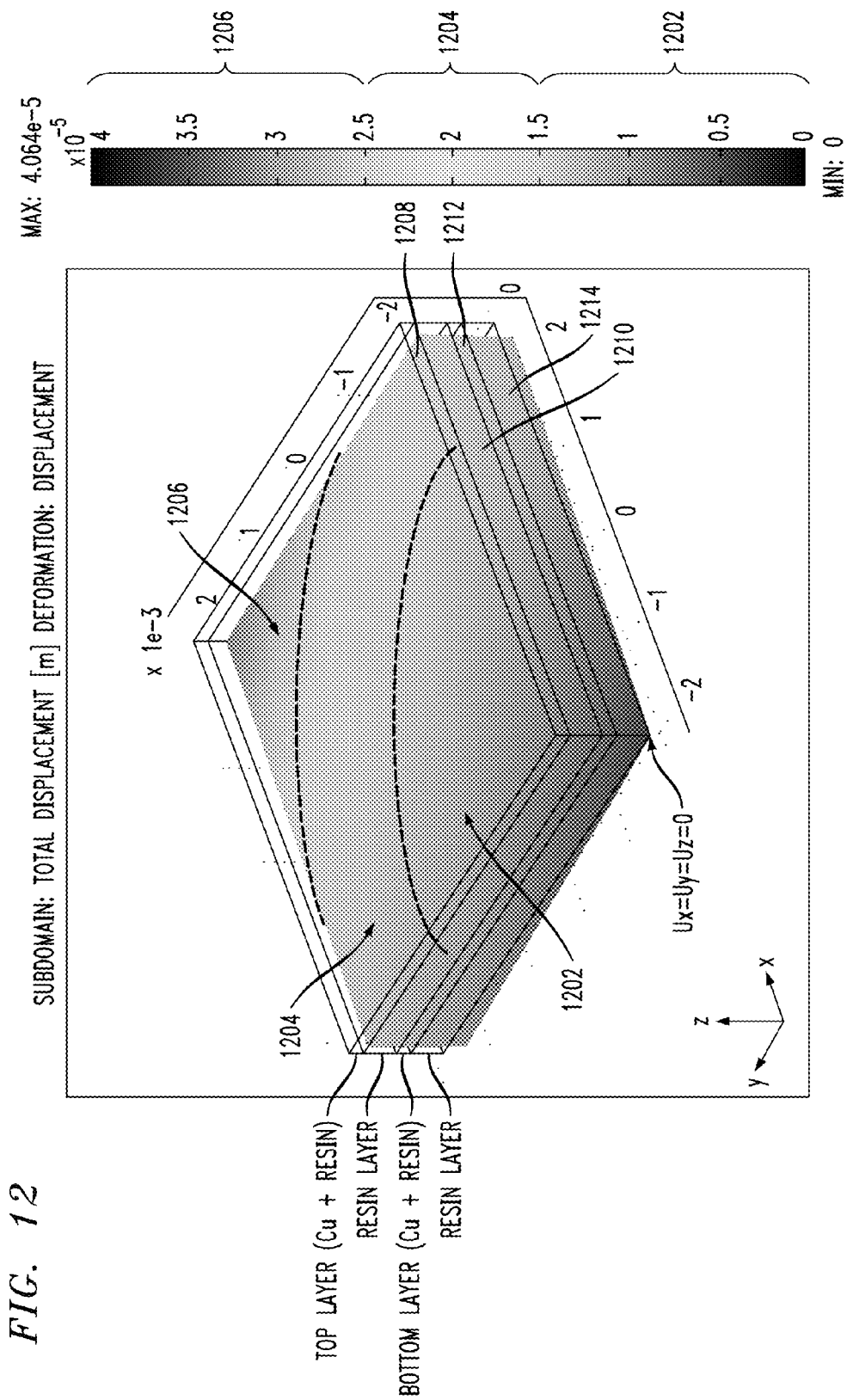
FIG. 12 depicts an exemplary method for estimating a CTE for an illustrative 3-D tile of an organic substrate, in accordance with an embodiment of the present invention.

FIG. 12 graphically depicts an exemplary method for estimating CTE for an illustrative 3-D tile of an organic substrate, according to an embodiment of the invention. The graph illustrates three regions of displacement, namely, a first region 1202 (e.g., about 0-15 µm), a second region 1204 (e.g., about 15-25 µm), and a third region 1206 (e.g., about 25-40 µm). By way of example only and without loss of generality, FIG. 12 illustrates an exemplary case where two copper circuit layers (each with embedded resin), 1208 and 1212, and two resin insulating layers, 1210 and 1214, located between adjacent circuit layers, are stacked to form a 3-D tile structure, and a CTE estimation experiment is simulated. For this illustrative case, it is assumed that the individual layers 1208, 1210, 1212, 1214, have CTE parameters as follows:
Top Copper+Embedded Resin Layer 1208 (e.g., 150 µm thick) CTE Values (ppm/K):
$CTE_x = 23.0$, $CTE_y = 21.0$
Bottom Copper+Embedded Resin Layer 1212 CTE Values (ppm/K):
$CTE_x = 21.1$, $CTE_y = 19.7$
Resin Layers 1210, 1214 (e.g., 350 µm thick) CTE Value (ppm/K):
CTE=46
Copper layers 1208, 1212 are preferably represented by their effective orthotropic parameters but their geometry is a simple parallelepiped. The effective CTE of this tile can be estimated using equation (5) above as follows:
Effective CTE of the tile:
$CTE_x = 31.3$ ppm/K and $CTE_y = 29.3$ ppm/K In the above illustrative case, the thickness of each layer was scaled up by a factor of 10× because the nominal thicknesses are about 100× smaller (e.g., about 40 µm thickness on a 4×4 mm layer) compared to the lengths of a side of the tile. The skewed geometry can give rise to an excessive number of elements for an FEM solver to compute in a reasonable time. To circumvent this challenge, the thickness of each layer in the tile is preferably scaled up to generate a moderate count of elements, and solved for thermomechanical effective parameters. Subsequently, for example, by means of applying reverse scaling (obtained through detailed FEM analysis), the expected parameters for the original geometry can be estimated.

Although the CTE determination methodology 1100 described above is calculated for a prescribed temperature range, it is to be understood that this methodology can be used for calculating CTE at multiple temperatures, because some materials exhibit an abrupt change in properties at certain temperatures. This can be accomplished using, for example, a step CTE calculation methodology, as will become apparent to those skilled in the art given the teachings herein.

Figure 13:
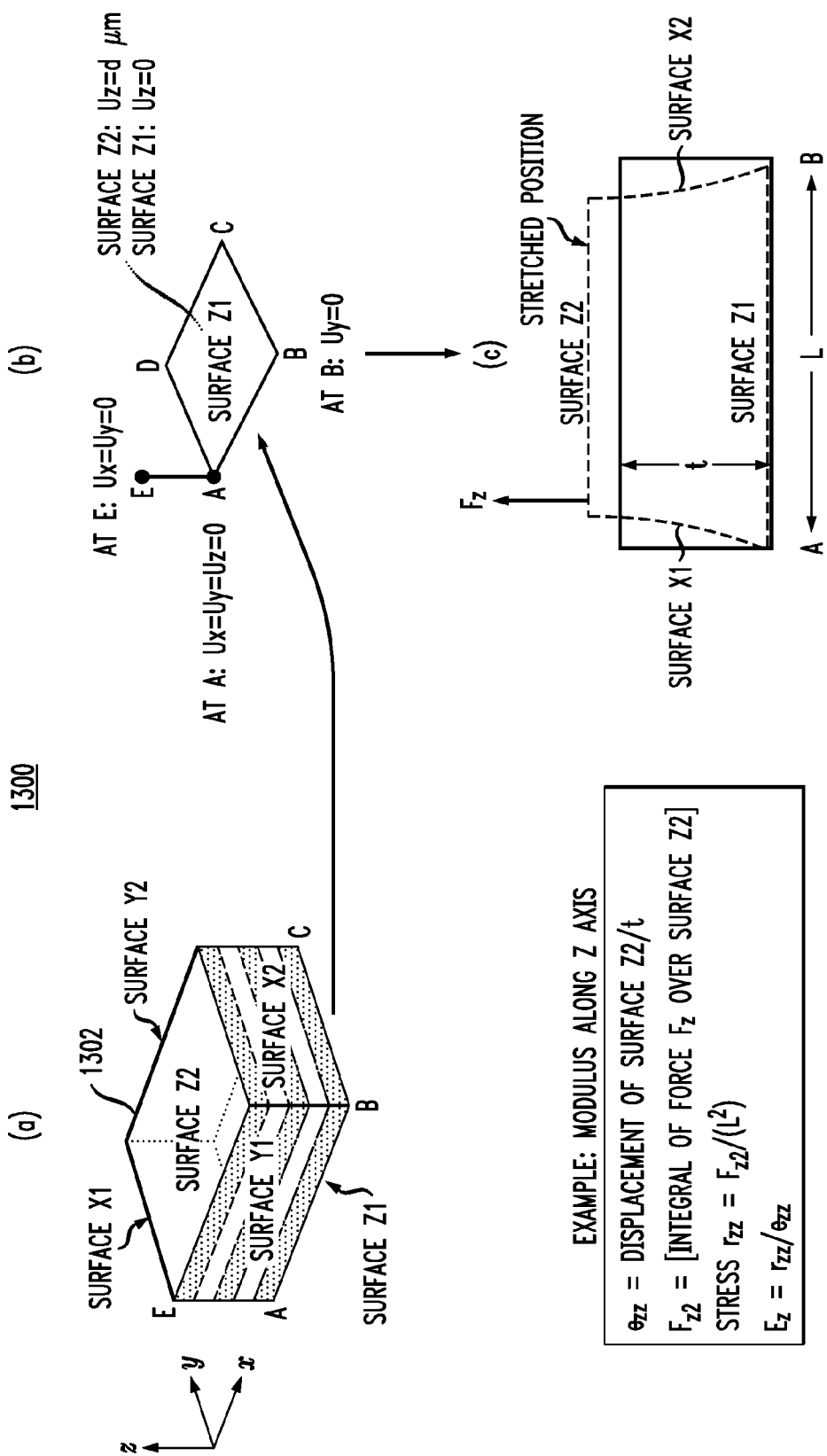
FIGS. 13A through 13C are conceptual views depicting an exemplary method for determining modulus of an illustrative 3-D tile of an organic substrate, in accordance with an embodiment of the present invention.

For modulus computation, different boundary conditions are used (compared to CTE determination), and temperature is held fixed at the value at which the modulus and Poisson's ratio are required. FIGS. 13A through 13C are conceptual views depicting an exemplary method 1300 for determining the modulus of an illustrative 3-D tile 1302 of an organic substrate, in accordance with an embodiment of the present invention. To extract modulus, displacement of a surface as a function of a change in the applied force is determined. In other words, given a prescribed amount of allowed displacement, the force required to move a surface by the prescribed amount can be calculated. It is to be appreciated that the numerical methodology shown in FIGS. 13A-13C is directed to estimating modulus along the z axis. To determine modulus along a different axis (e.g., x or y), a similar approach may be used.

FIG. 13A illustrates an assignment of surface names to the tile 1302 which is the same as that defined in FIG. 11A, although essentially consistent any naming convention may be employed. As shown in FIG. 13B, to compute modulus along the z axis, surface Z1 is preferably constrained in the z direction but is allowed to move freely in the x and y directions (e.g., Uz=0, Ux=free, Uy=free). Surface Z2 is given a predetermined displacement (e.g., about 10 µm) along the z axis. A 3-D solid deformation FEM solution is then generated. The distributed surface force, $F_z$, that is required to produce 10 µm of displacement may be determined using the expressions below, where the average force, $\overline{F}_z$, is given by equation (6) and the corresponding average stress $\overline{\sigma}_z$, is given by equation (7) below.

$$\overline{F}_z = \frac{1}{L^2}\int_0^L\int_0^L F_z\, dx\, dy \quad (6)$$

$$\overline{\sigma}_z = \frac{1}{L^4}\int_0^L\int_0^L F_z\, dx\, dy \quad (7)$$

Observe that the displacement vector (Ux Uy Uz) produced by the FEM solution at fixed temperature due to an imposed displacement is different from the vector magnitude and direction that are produced for the CTE estimates in equations (1) through (5) above.

The average stress on surface Z2 divided by the average strain along the z axis produces an estimate for modulus, $E_z$, along the z axis, as defined by equation (8) below.

$$E_z = \frac{\bar{\sigma}_z}{(10 \cdot 10^{-6}/L)} \quad (8)$$

The ratio of strain in the x direction divided by strain in the z direction will produce an estimate for Poisson's ratio $v_{xz}$. The applied strain with assumed boundary conditions for a 10 μm displacement is given by equation (9) below. The corresponding strain in the x-direction due to applied strain in the z direction is given by equation (10) below, where the integrand is the difference in displacement in the x direction (Ux) corresponding to surfaces X2 and X1. Poisson's ratio $v_{xz}$, for example, is given by equation (11) below.

$$\varepsilon_z = (10 * 10^{-6}/L) \quad (9)$$

$$\bar{\varepsilon}_x = \frac{1}{L^2 t} \int_0^t \int_0^L \Delta U_x \, dy \, dz \quad (10)$$

$$v_{xz} = \bar{\varepsilon}_x / \varepsilon_z \quad (11)$$

The above process can be repeated for the x and y axes to estimate modulus $E_x$ and $E_y$, respectively. Furthermore, the process for determining modulus is performed for a prescribed temperature. However, according to other aspects of the invention, modulus may also be determined for multiple temperatures of interest, because some materials may exhibit an abrupt change in property at a certain temperature (e.g., glass transition temperature).

Figure 14:
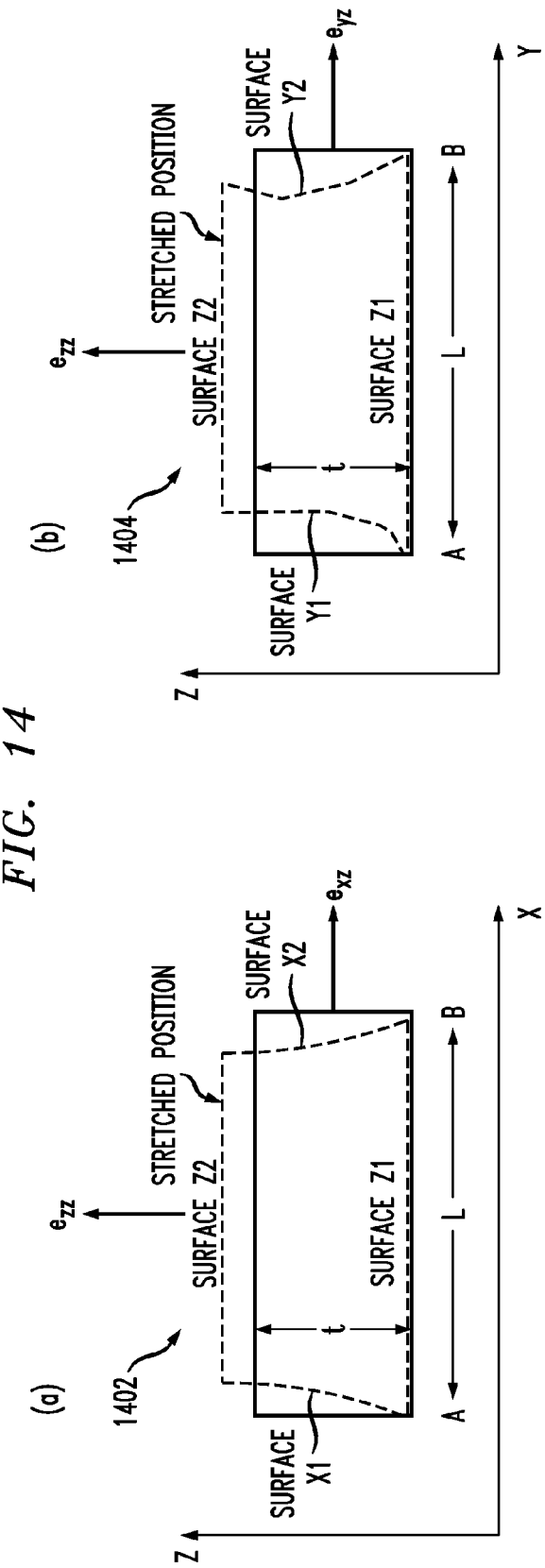
FIGS. 14A and 14B are conceptual views depicting an exemplary method for determining Poisson's ratio of an illustrative 3-D tile of an organic substrate, in accordance with an embodiment of the present invention.

Poisson's ratio may be used to characterize how much a primary strain affects a secondary strain. Since Poisson's ratio involves essentially comparing two strain quantities, Poisson's ratio may be determined from the same information used to calculate modulus in the above-noted methodology. FIGS. 14A and 14B are conceptual views depicting exemplary methods for determining Poisson's ratios corresponding to an illustrative 3-D tile of an organic substrate, in accordance with an embodiment of the present invention. FIG. 14A shows an exemplary method 1402 for determining Poisson's ratio for strain in the z direction to strain in the x direction, and FIG. 14B shows an exemplary method 1404 for determining Poisson's ratio for strain in the z direction to strain in the y direction.

Figure 15:
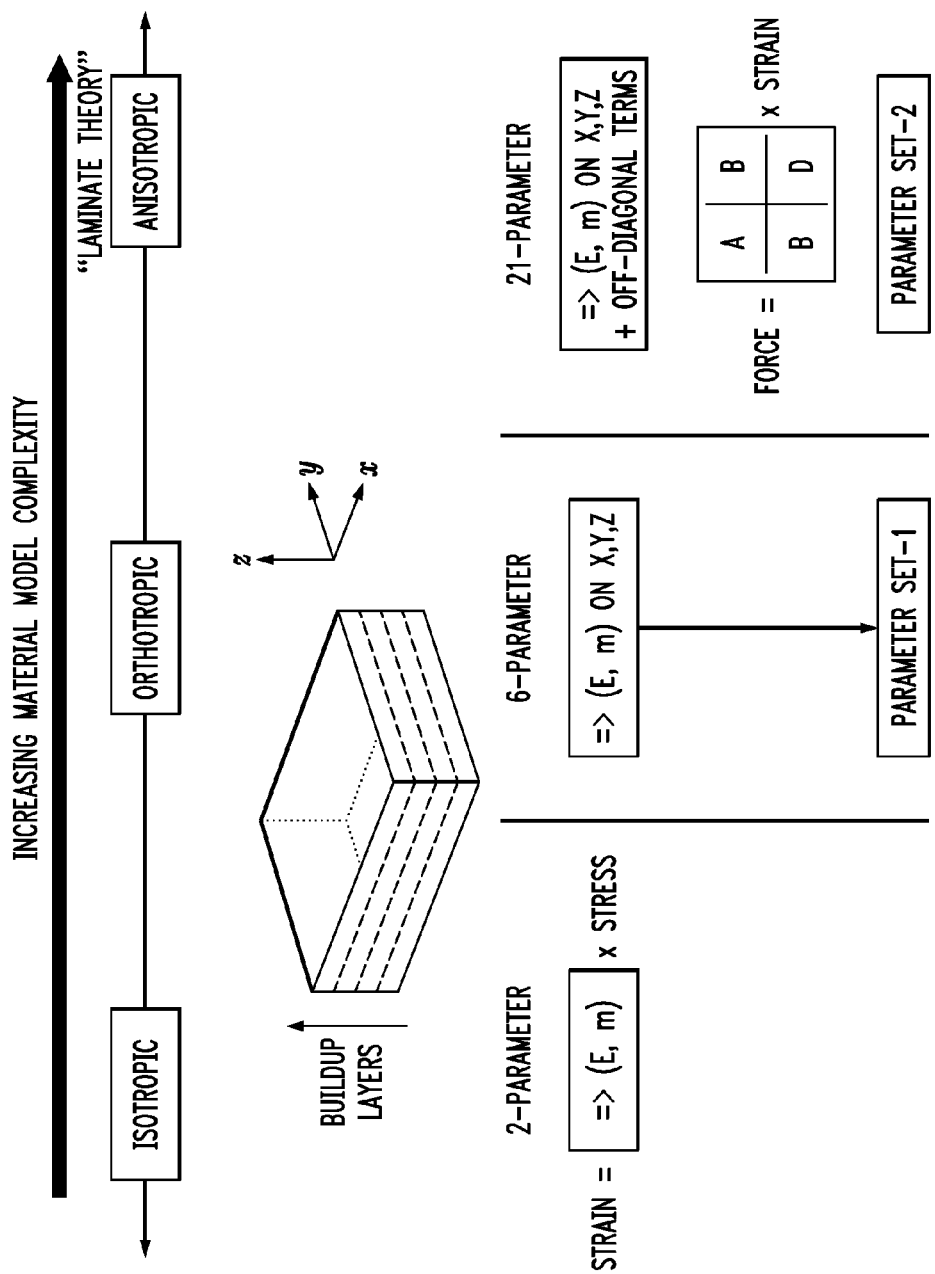
FIG. 15 is a conceptual view depicting material property with increasing detail and complexity, according to aspects of the invention.

It is to be appreciated that the methods for determining modulus and Poisson's ratio are shown for a single direction. However, methods consistent with those described above may be similarly employed for calculating modulus and Poisson's ratio in other directions, as will be known by those skilled in the art given the teachings herein. Moreover, the numerical computations represented by equations (1) through (11) above correspond to equivalent orthotropic properties of the tile. Similar methods can be extended to define anisotropic parameters of a tile as well. Exemplary differences between isotropic, orthotropic and anisotropic parameter sets are shown with reference to FIG. 15.

The method presented herein incorporates substantially full geometric detail of the circuit layer structure. Since this method can result in an excessive number of elements needed for FEM analysis, the very fact that limits the use of FEM to analyze an entire organic substrate without any approximations and forces the use of "tiles," a certain trade-offs can be considered. For example, the 3-D representation of a single complex layer can be numerically subjected to similar methods as outlined above for a tile, its effective orthotropic properties can be obtained first. Following this process for each layer, a new stack of layers with equivalent properties just computed for each layer can be formulated without complex geometry. Thus, the number of elements for a complete 3-D solution can be avoided by introducing this intermediate step, according to other embodiments of the invention.

At least a portion of the techniques of the present invention may be implemented in one or more integrated circuits. In forming integrated circuits, die are typically fabricated in a repeated pattern on a surface of a semiconductor wafer. Individual die are cut or diced from the wafer, then packaged as integrated circuits. In packaging the dies, individual die are attached to a receiving substrate according to methods of the invention. One skilled in the art would know how to dice wafers to produce integrated circuits. Integrated circuits so manufactured are considered part of this invention.

An integrated circuit formed in accordance with techniques of the present invention can be employed in essentially any application and/or electronic system requiring an accurate prediction of thermomechanical properties of an organic substrate. Suitable systems for implementing the invention may include, but are not limited to, personal computers, test and measurement devices, portable communications devices (e.g., cell phones), etc. Systems incorporating such integrated circuits are considered part of this invention. For future computer technology that stacks multiple layers of processors and memories, where each device layer is built on very thin silicon die (e.g., about 10-50 μm thick), warp due at least in part to the complexity of the circuits can become significant, and the warp projection method according to embodiments of the invention can be beneficially applied in such configurations to optimize performance of the device, among other advantages. Given the teachings of the invention provided herein, one of ordinary skill in the art will be able to contemplate other implementations and applications of the techniques of the invention.

Although illustrative embodiments of the invention have been described herein with reference to the accompanying drawings, it is to be understood that the invention is not limited to those precise embodiments, and that various other changes and modifications may be made therein by one skilled in the art without departing from the scope of the appended claims.

What is claimed is:

1. A computer-implemented method for characterizing an organic substrate including a plurality of circuit layers, the method comprising the steps of:

receiving a two-dimensional circuit layer image corresponding to a selected one of the plurality of circuit layers of at least a portion of the organic substrate, the two-dimensional circuit layer image including a geometric description of the selected one of the plurality of circuit layers of the substrate;

generating a three-dimensional FEM circuit layer image of at least a portion of the substrate as a function of the received two-dimensional circuit layer image;

repeating the steps of receiving a two-dimensional circuit layer image and generating the three-dimensional FEM circuit layer image until all of the plurality of layers in the at least a portion of the substrate have been processed;

combining all of the two-dimensional FEM images corresponding to the respective circuit layer images to form a three-dimensional FEM image representing the at least a portion of the substrate;

determining at least one of a coefficient of thermal expansion (CTE), modulus and Poisson's ratio of the three-dimensional FEM image; and constructing a three-dimensional representation of the at least a portion of the substrate as a function of at least one of the CTE, modulus and Poisson's ratio of the three-dimensional FEM image.

2. The method of claim 1, wherein the step of generating the three-dimensional FEM image of at least a portion of the substrate comprises the steps of:
   converting the received circuit layer image to a two-dimensional finite element model (FEM) image of the received circuit layer image; and
   extruding the two-dimensional FEM circuit layer image to generate a three-dimensional FEM domain corresponding to the received circuit layer image.

3. The method of claim 2, wherein the step of generating the three-dimensional FEM image of at least a portion of the substrate further comprises the steps of:
   generating a three-dimensional FEM metal domain as a function of the extruded two-dimensional FEM circuit layer image; and
   embedding a dielectric material representation into the three-dimensional FEM metal domain.

4. The method of claim 3, wherein the step of generating the three-dimensional FEM image of at least a portion of the substrate further comprises adding a dielectric layer between adjacent FEM metal domains to electrically isolate the FEM metal domains from one another.

5. The method of claim 1, further comprising the step of dividing the organic substrate into a plurality of substantially equal-sized regions as a function of the geometric description of the plurality of circuit layers of the substrate.

6. The method of claim 1, wherein the two-dimensional circuit layer image of at least a portion of the organic substrate comprises a bitmap image.

7. The method of claim 1, wherein the two-dimensional circuit layer image of at least a portion of the organic substrate comprises a board file.

8. The method, of claim 2, wherein the step of converting the image to a two-dimensional FEM image comprises rasterizing the image.

9. The method of claim 8, wherein the step of converting the image to a two-dimensional FEM image of the given one of the circuit layers comprises the steps of:
   identifying at least one geometric feature within the given one of the circuit layers;
   merging internal boundaries of the at least one geometric feature when a size of the at least one feature is greater than a thickness of the slices; and
   retaining internal boundaries of the at least one geometric feature when a size of the at least one feature is less than or equal to a thickness of the slices.

10. The method of claim 1, further comprising the step of incorporating at least one property corresponding to a thermomechanical interaction between adjacent circuit layers in the at least a portion of the substrate into the three-dimensional representation of the at least a portion of the substrate.

11. The method of claim 1, further comprising the step of storing the three-dimensional FEM representation of the at least a portion of the organic substrate in memory.

12. The method of claim 1, wherein the step of determining at least one of a three-dimensional CTE, modulus and Poisson's ratio of the three-dimensional FEM image comprises:
   selecting a metal domain including a plurality of metal geometries; and
   assigning at least one thermomechanical property to each of the plurality of metal geometries.

13. The method of claim 1, wherein the step of determining at least one of a CTE, modulus and Poisson's ratio of the FEM image comprises:
   selecting a three-dimensional FEM metal domain including a plurality of metal geometries;
   assigning at least one thermomechanical property to each of the plurality of metal geometries;
   generating a three-dimensional FEM dielectric material domain as a function of the metal domain, the dielectric material domain including a plurality of dielectric geometries; and
   assigning at least one thermomechanical property to each of the plurality of dielectric geometries.

14. The method of claim 2, wherein the step of constructing a three-dimensional representation of at least a portion of the organic substrate comprises combining the plurality of extruded FEM circuit layer images prior to the step of determining at least one of a coefficient of thermal expansion (CTE), modulus and Poisson's ratio of the three-dimensional FEM image.

15. The method of claim 1, further comprising determining whether or not to fabricate the organic substrate based at least in part on the three-dimensional FEM representation of at least a portion of the organic substrate.

16. The method of claim 1, wherein the step of determining at least one of: a three-dimensional CTE, modulus and Poisson's ratio of the three-dimensional FEM image comprises performing at least one of three-dimensional thermal expansion and stretching FEM operations; and extracting at least one thermomechanical property of at least a portion of the substrate.

17. An apparatus for characterizing an organic substrate including a plurality of circuit layers, the apparatus comprising:
   a memory; and
   at least one processor coupled to the memory, the at least one processor being operative: to receive a two-dimensional circuit layer image corresponding to a selected one of the plurality of circuit layers of at least a portion of the organic substrate, the two-dimensional circuit layer image including a geometric description of the selected one of the plurality of circuit layers of the substrate; to generate a three-dimensional FEM circuit layer image of at least a portion of the substrate as a function of the received two-dimensional circuit layer image; to repeat steps of receiving the two-dimensional circuit layer image and generating the three-dimensional FEM circuit layer image until all of the plurality of layers in the at least a portion of the substrate have been processed; to combine all of the two-dimensional FEM images corresponding to the respective circuit layer images to form a three-dimensional FEM image representing the at least a portion of the substrate; to determine at least one of a coefficient of thermal expansion (CTE), modulus and Poisson's ratio of the three-dimensional FEM image; and to construct a three-dimensional representation of the at least a portion of the substrate as a function of at least one of the CTE, modulus and Poisson's ratio of the three-dimensional FEM image.

18. An article of manufacture for characterizing an organic substrate including a plurality of circuit layers, the article comprising a computer readable tangible storage medium having one or more programs embodied therewith, wherein the one or more programs, when executed by a computer, perform steps of:
   receiving a two-dimensional circuit layer image corresponding to a selected one of the plurality of circuit layers of at least a portion of the organic substrate, the two-dimensional circuit layer image including a geometric description of the selected one of the plurality of circuit layers of the substrate;

generating a three-dimensional FEM circuit layer image of at least a portion of the substrate as a function of the received two-dimensional circuit layer image;

repeating the steps of receiving a two-dimensional circuit layer image and generating the three-dimensional FEM circuit layer image until all of the plurality of layers in the at least a portion of the substrate have been processed;

combining all of the two-dimensional FEM images corresponding to the respective circuit layer images to form a three-dimensional FEM image representing the at least a portion of the substrate;

determining at least one of a coefficient of thermal expansion (CTE), modulus and Poisson's ratio of the three-dimensional FEM image; and constructing a three-dimensional representation of the at least a portion of the substrate as a function of at least one of the CTE, modulus and Poisson's ratio of the three-dimensional FEM image.

* * * * *